(12) United States Patent
Murakami

(10) Patent No.: US 10,998,826 B2
(45) Date of Patent: May 4, 2021

(54) CONVERTER PROVIDED WITH CONTROL UNIT THAT PERFORMS SWITCHING CONTROL FOR SWITCHING ELEMENTS

(71) Applicant: SHARP KABUSHIKI KAISHA, Sakai (JP)

(72) Inventor: Kohzaburoh Murakami, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/792,593

(22) Filed: Feb. 17, 2020

(65) Prior Publication Data
US 2020/0266717 A1 Aug. 20, 2020

Related U.S. Application Data

(60) Provisional application No. 62/808,000, filed on Feb. 20, 2019.

(51) Int. Cl.
*H02M 3/335* (2006.01)
*H02M 1/42* (2007.01)

(52) U.S. Cl.
CPC ..... *H02M 3/33584* (2013.01); *H02M 1/4208* (2013.01); *H02M 1/4233* (2013.01); *H02M 1/4258* (2013.01)

(58) Field of Classification Search
CPC ........... H02M 1/4233; H02M 3/33584; H03M 1/4258; H03M 1/4208
See application file for complete search history.

(56) References Cited

U.S. PATENT DOCUMENTS

| | | | | |
|---|---|---|---|---|
| 5,442,534 A | * | 8/1995 | Cuk | H02M 3/005 363/16 |
| 8,208,274 B2 | * | 6/2012 | Raju | H02M 3/3376 363/17 |
| 8,891,254 B2 | * | 11/2014 | Kominami | B60L 58/20 363/17 |
| 9,931,951 B2 | * | 4/2018 | Khaligh | B60L 53/22 |
| 2007/0297198 A1 | * | 12/2007 | Chang | H02M 3/337 363/17 |
| 2008/0094859 A1 | * | 4/2008 | Takayanagi | H02M 7/4807 363/17 |
| 2008/0101096 A1 | * | 5/2008 | Takayanagi | B60L 53/22 363/17 |
| 2008/0112198 A1 | * | 5/2008 | Cheah | H02M 7/2176 363/84 |
| 2008/0174276 A1 | * | 7/2008 | Takahashi | H02J 9/061 320/128 |
| 2009/0141519 A1 | * | 6/2009 | Hong | H02M 3/33576 363/17 |

(Continued)

FOREIGN PATENT DOCUMENTS

JP 2014-087134 A 5/2014

*Primary Examiner* — Yusef A Ahmed
(74) *Attorney, Agent, or Firm* — ScienBiziP, P.C.

(57) ABSTRACT

To achieve an improvement in the power factor of the input into a primary converter in a case of inputting alternating-current (AC) power. A converter is provided with a control unit that performs a switching control such that power is supplied from a primary converter to a secondary converter while keeping a voltage supplied to a load constant, and also such that power is supplied from the primary converter to a tertiary converter while keeping a current supplied to a tertiary capacitor constant.

8 Claims, 30 Drawing Sheets

(56) References Cited

U.S. PATENT DOCUMENTS

| | | | |
|---|---|---|---|
| 2010/0142240 A1* | 6/2010 | Lee | H02M 3/3378 |
| | | | 363/132 |
| 2012/0224397 A1* | 9/2012 | Yeh | H02M 3/33507 |
| | | | 363/21.12 |
| 2013/0201733 A1* | 8/2013 | Divan | H02M 5/225 |
| | | | 363/39 |
| 2015/0349649 A1* | 12/2015 | Zane | H02M 1/4241 |
| | | | 363/21.03 |
| 2016/0204707 A1* | 7/2016 | Takahara | H02M 1/4258 |
| | | | 363/16 |
| 2017/0070155 A1* | 3/2017 | Takahara | H02M 3/33584 |
| 2017/0214322 A1* | 7/2017 | Lin | H02M 1/4258 |
| 2017/0237354 A1* | 8/2017 | Takahara | H02M 1/08 |
| | | | 363/17 |
| 2017/0366099 A1* | 12/2017 | Li | H02M 1/4233 |
| 2019/0052176 A1* | 2/2019 | Yabuzaki | H02M 1/32 |
| 2019/0148973 A1* | 5/2019 | Kim | B60L 53/22 |
| | | | 320/109 |
| 2019/0190393 A1* | 6/2019 | Murakami | H02M 3/33561 |
| 2019/0348833 A1* | 11/2019 | Sun | H02M 1/4258 |
| 2020/0083818 A1* | 3/2020 | Lin | H01F 30/10 |
| 2020/0212817 A1* | 7/2020 | Sun | B60L 50/64 |
| 2020/0235673 A1* | 7/2020 | Shiomi | H02M 3/33592 |

\* cited by examiner

FIG. 1

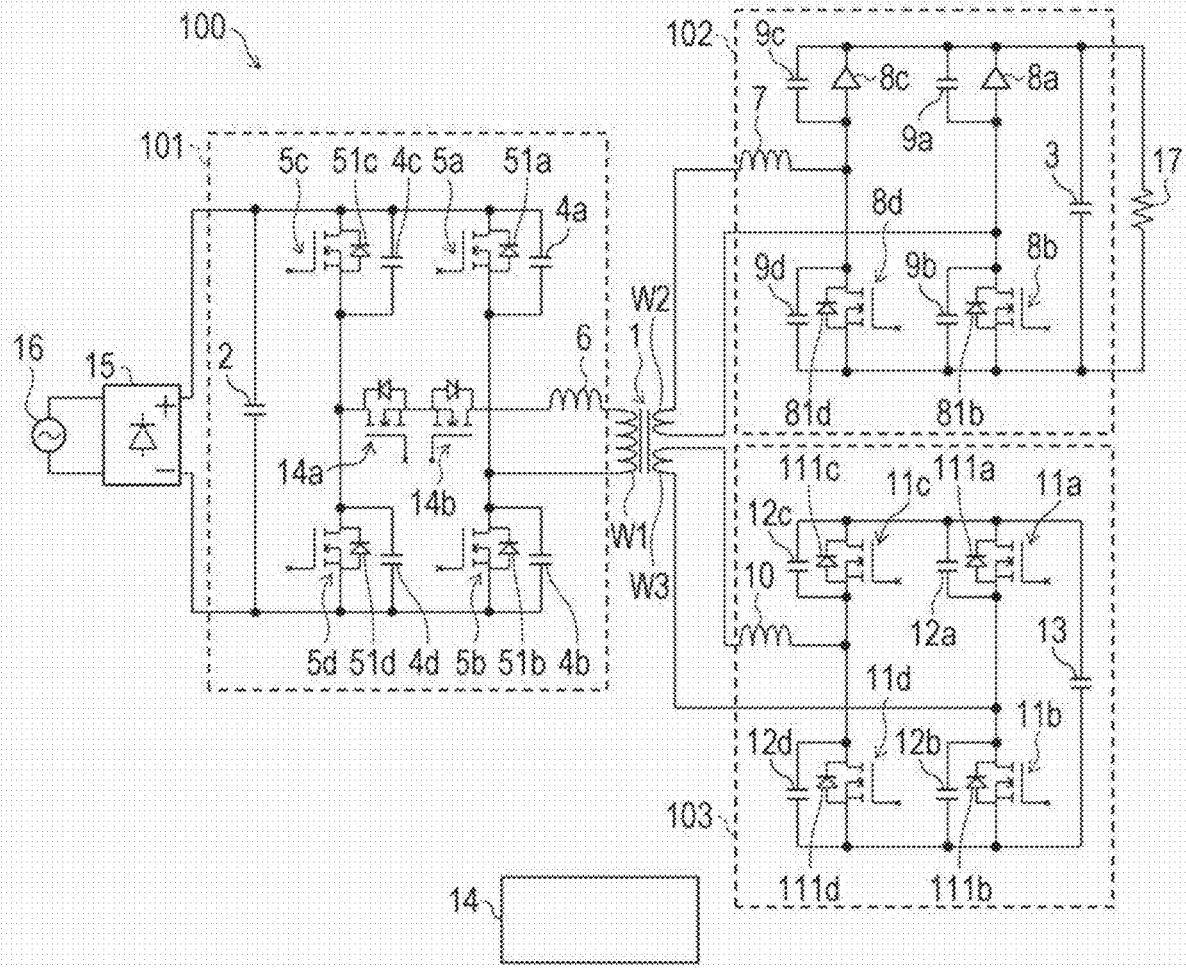

1: TRANSFORMER
2: INPUT CAPACITOR
3: OUTPUT CAPACITOR
4a–4d: FIRST RESONANCE CAPACITOR
5a–5d: FIRST SWITCHING ELEMENT
6: FIRST COIL
7: SECOND COIL
8a, 8c: RECTIFYING DIODE
8b, 8d: SECOND SWITCHING ELEMENT
9a–9d: SECOND RESONANCE CAPACITOR
10: THIRD COIL
11a–11d: THIRD SWITCHING ELEMENT
12a–12d: THIRD RESONANCE CAPACITOR
13: TERTIARY CAPACITOR
14: CONTROL UNIT 14a, 14b: BIDIRECTIONAL SWITCH
15: RECTIFIER CIRCUIT
16: AC POWER SOURCE
17: LOAD
51a–51d: FIRST DIODE
81b, 81d: SECOND DIODE
100: CONVERTER
101: PRIMARY CONVERTER
102: SECONDARY CONVERTER
103: TERTIARY CONVERTER
111a–111d: THIRD DIODE
W1: PRIMARY WINDING
W2: SECONDARY WINDING
W3: TERTIARY WINDING

FIG. 4A

| | CONTROL PATTERN A1 | CONTROL PATTERN B1 |
|---|---|---|
| PRIMARY →SECONDARY | MODE 1 | MODE 2 |
| PRIMARY →TERTIARY | MODE 2 | MODE 2 |

FIG. 4B

| | CONTROL PATTERN C1 | CONTROL PATTERN D1 | CONTROL PATTERN E1 | CONTROL PATTERN F1 |
|---|---|---|---|---|
| PRIMARY →SECONDARY | MODE 1 | MODE 2 | MODE 2 | MODE 1 |
| TERTIARY →SECONDARY | MODE 1 | MODE 1 | MODE 2 | MODE 2 |

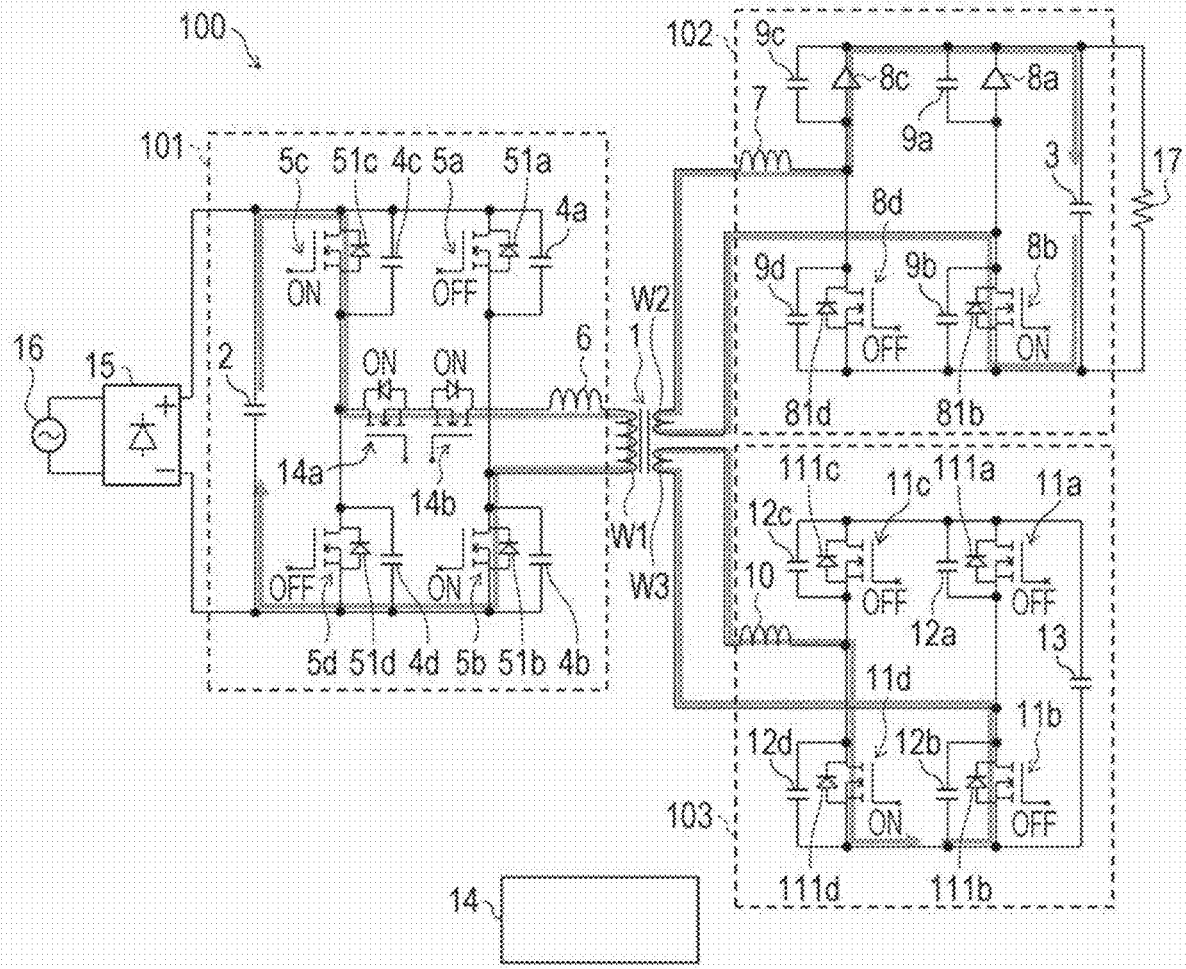

1: TRANSFORMER
2: INPUT CAPACITOR
3: OUTPUT CAPACITOR
4a-4d: FIRST RESONANCE CAPACITOR
5a-5d: FIRST SWITCHING ELEMENT
6: FIRST COIL
7: SECOND COIL
8a, 8c: RECTIFYING DIODE
8b, 8d: SECOND SWITCHING ELEMENT
9a-9d: SECOND RESONANCE CAPACITOR
10: THIRD COIL
11a-11d: THIRD SWITCHING ELEMENT
12a-12d: THIRD RESONANCE CAPACITOR
13: TERTIARY CAPACITOR
14: CONTROL UNIT 14a, 14b: BIDIRECTIONAL SWITCH
15: RECTIFIER CIRCUIT
16: AC POWER SOURCE
17: LOAD
51a-51d: FIRST DIODE
81b, 81d: SECOND DIODE
100: CONVERTER
101: PRIMARY CONVERTER
102: SECONDARY CONVERTER
103: TERTIARY CONVERTER
111a-111d: THIRD DIODE
W1: PRIMARY WINDING
W2: SECONDARY WINDING
W3: TERTIARY WINDING

FIG. 7

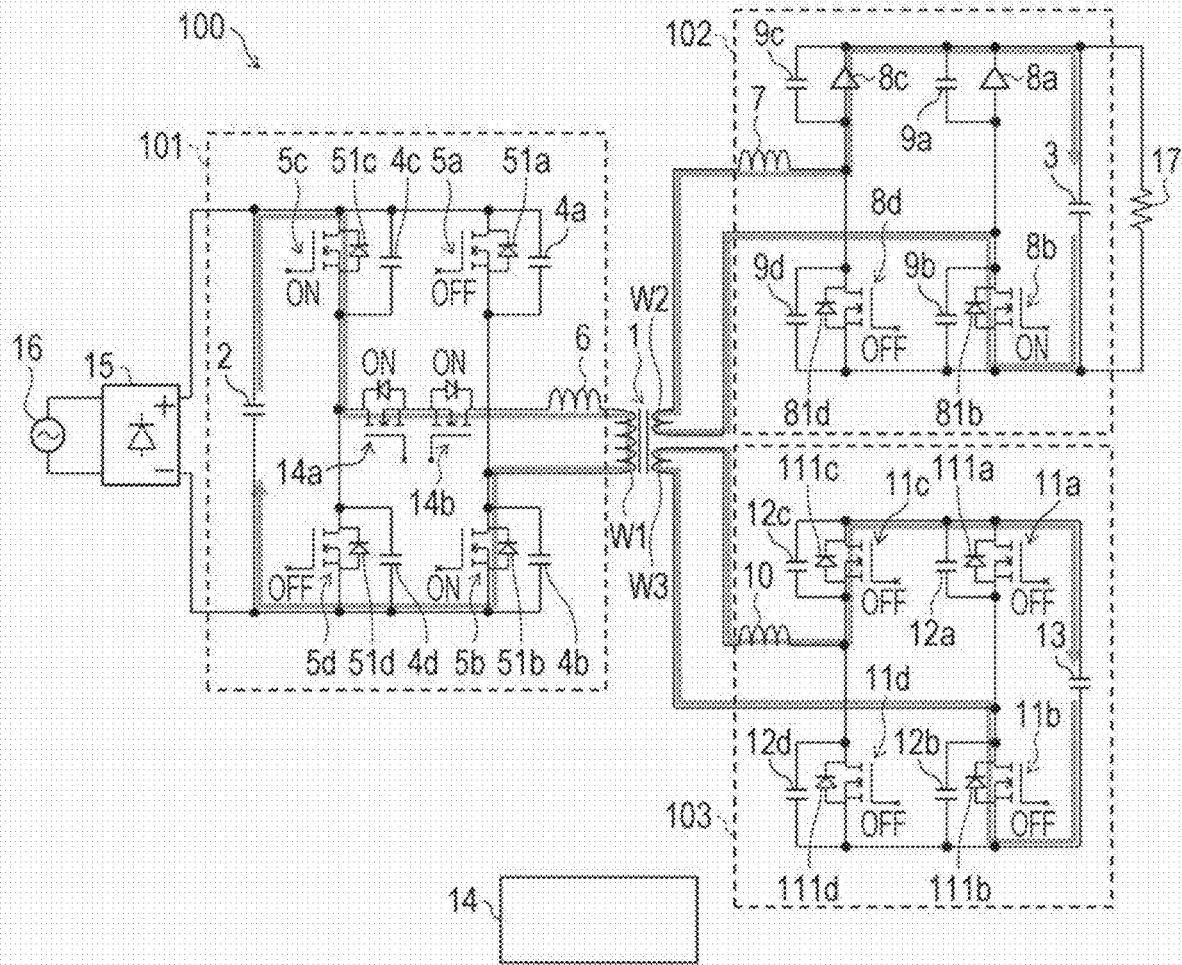

1: TRANSFORMER
2: INPUT CAPACITOR
3: OUTPUT CAPACITOR
4a–4d: FIRST RESONANCE CAPACITOR
5a–5d: FIRST SWITCHING ELEMENT
6: FIRST COIL
7: SECOND COIL
8a, 8c: RECTIFYING DIODE
8b, 8d: SECOND SWITCHING ELEMENT
9a–9d: SECOND RESONANCE CAPACITOR
10: THIRD COIL
11a–11d: THIRD SWITCHING ELEMENT
12a–12d: THIRD RESONANCE CAPACITOR
13: TERTIARY CAPACITOR
14: CONTROL UNIT
14a, 14b: BIDIRECTIONAL SWITCH
15: RECTIFIER CIRCUIT
16: AC POWER SOURCE
17: LOAD
51a–51d: FIRST DIODE
81b, 81d: SECOND DIODE
100: CONVERTER
101: PRIMARY CONVERTER
102: SECONDARY CONVERTER
103: TERTIARY CONVERTER
111a–111d: THIRD DIODE
W1: PRIMARY WINDING
W2: SECONDARY WINDING
W3: TERTIARY WINDING

FIG. 8

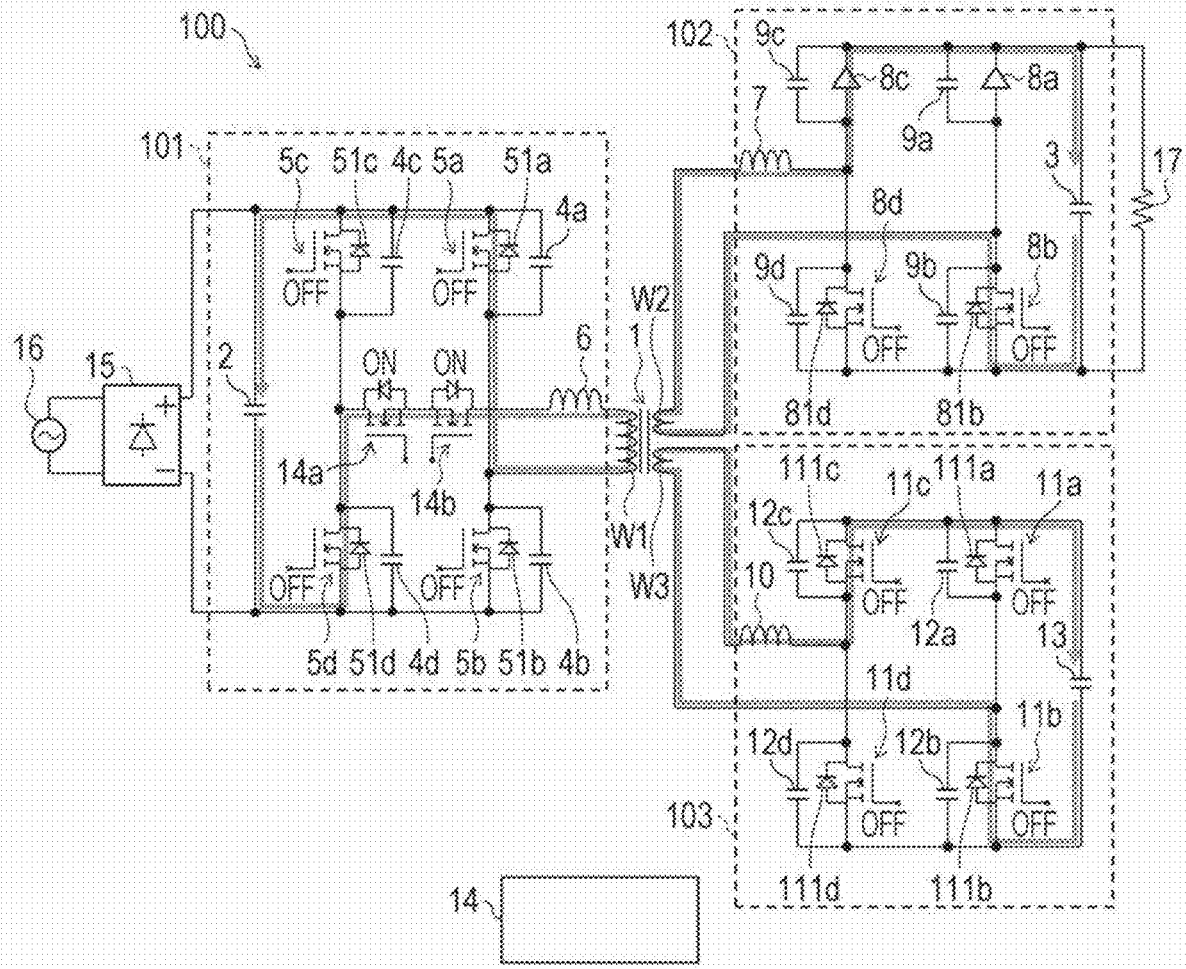

1: TRANSFORMER
2: INPUT CAPACITOR
3: OUTPUT CAPACITOR
4a–4d: FIRST RESONANCE CAPACITOR
5a–5d: FIRST SWITCHING ELEMENT
6: FIRST COIL
7: SECOND COIL
8a, 8c: RECTIFYING DIODE
8b, 8d: SECOND SWITCHING ELEMENT
9a–9d: SECOND RESONANCE CAPACITOR
10: THIRD COIL
11a–11d: THIRD SWITCHING ELEMENT
12a–12d: THIRD RESONANCE CAPACITOR
13: TERTIARY CAPACITOR
14: CONTROL UNIT 14a, 14b: BIDIRECTIONAL SWITCH
15: RECTIFIER CIRCUIT
16: AC POWER SOURCE
17: LOAD
51a–51d: FIRST DIODE
81b, 81d: SECOND DIODE
100: CONVERTER
101: PRIMARY CONVERTER
102: SECONDARY CONVERTER
103: TERTIARY CONVERTER
111a–111d: THIRD DIODE
W1: PRIMARY WINDING
W2: SECONDARY WINDING
W3: TERTIARY WINDING

FIG. 9

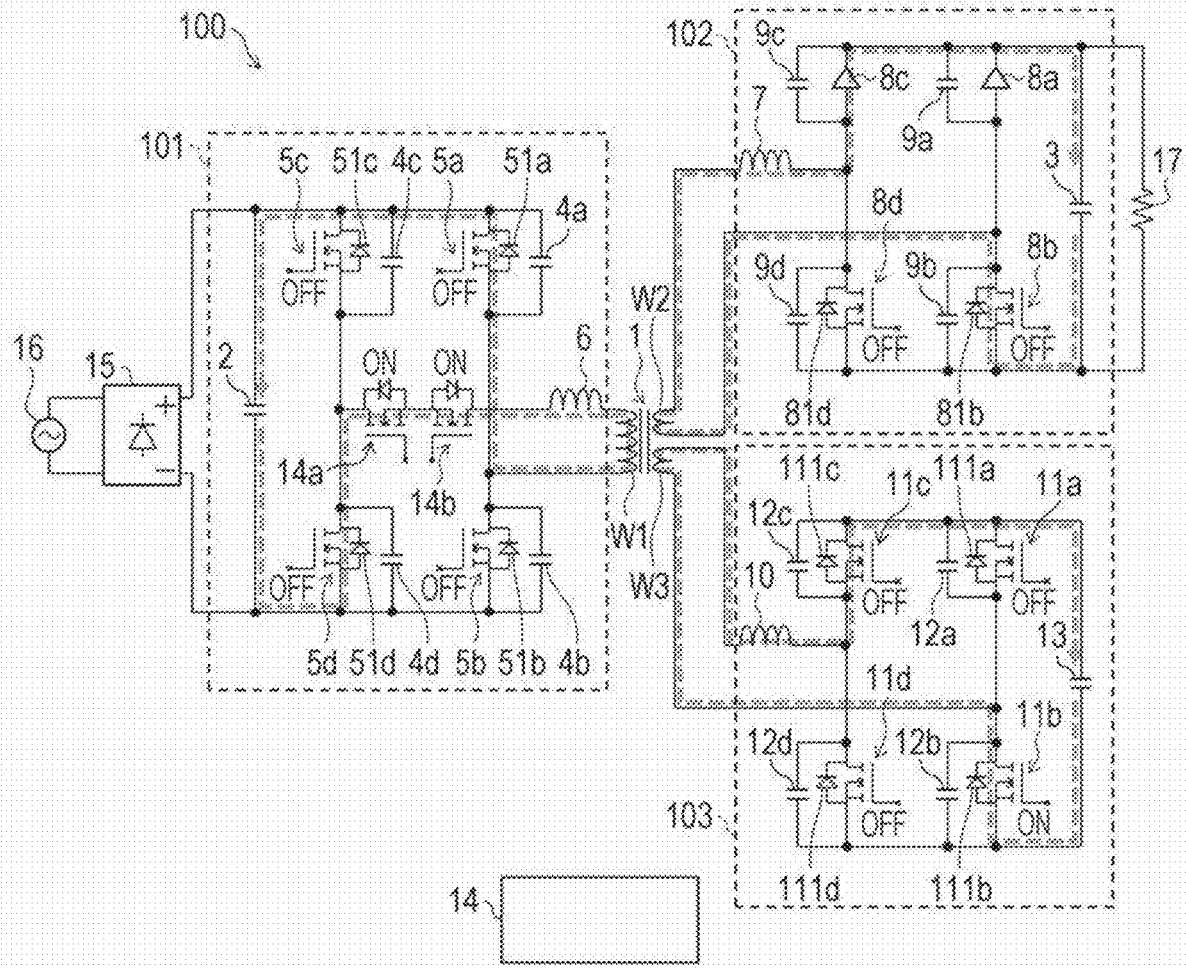

1: TRANSFORMER
2: INPUT CAPACITOR
3: OUTPUT CAPACITOR
4a-4d: FIRST RESONANCE CAPACITOR
5a-5d: FIRST SWITCHING ELEMENT
6: FIRST COIL
7: SECOND COIL
8a, 8c: RECTIFYING DIODE
8b, 8d: SECOND SWITCHING ELEMENT
9a-9d: SECOND RESONANCE CAPACITOR
10: THIRD COIL
11a-11d: THIRD SWITCHING ELEMENT
12a-12d: THIRD RESONANCE CAPACITOR
13: TERTIARY CAPACITOR
14: CONTROL UNIT 14a, 14b: BIDIRECTIONAL SWITCH
15: RECTIFIER CIRCUIT
16: AC POWER SOURCE
17: LOAD
51a-51d: FIRST DIODE
81b, 81d: SECOND DIODE
100: CONVERTER
101: PRIMARY CONVERTER
102: SECONDARY CONVERTER
103: TERTIARY CONVERTER
111a-111d: THIRD DIODE
W1: PRIMARY WINDING
W2: SECONDARY WINDING
W3: TERTIARY WINDING

FIG. 10

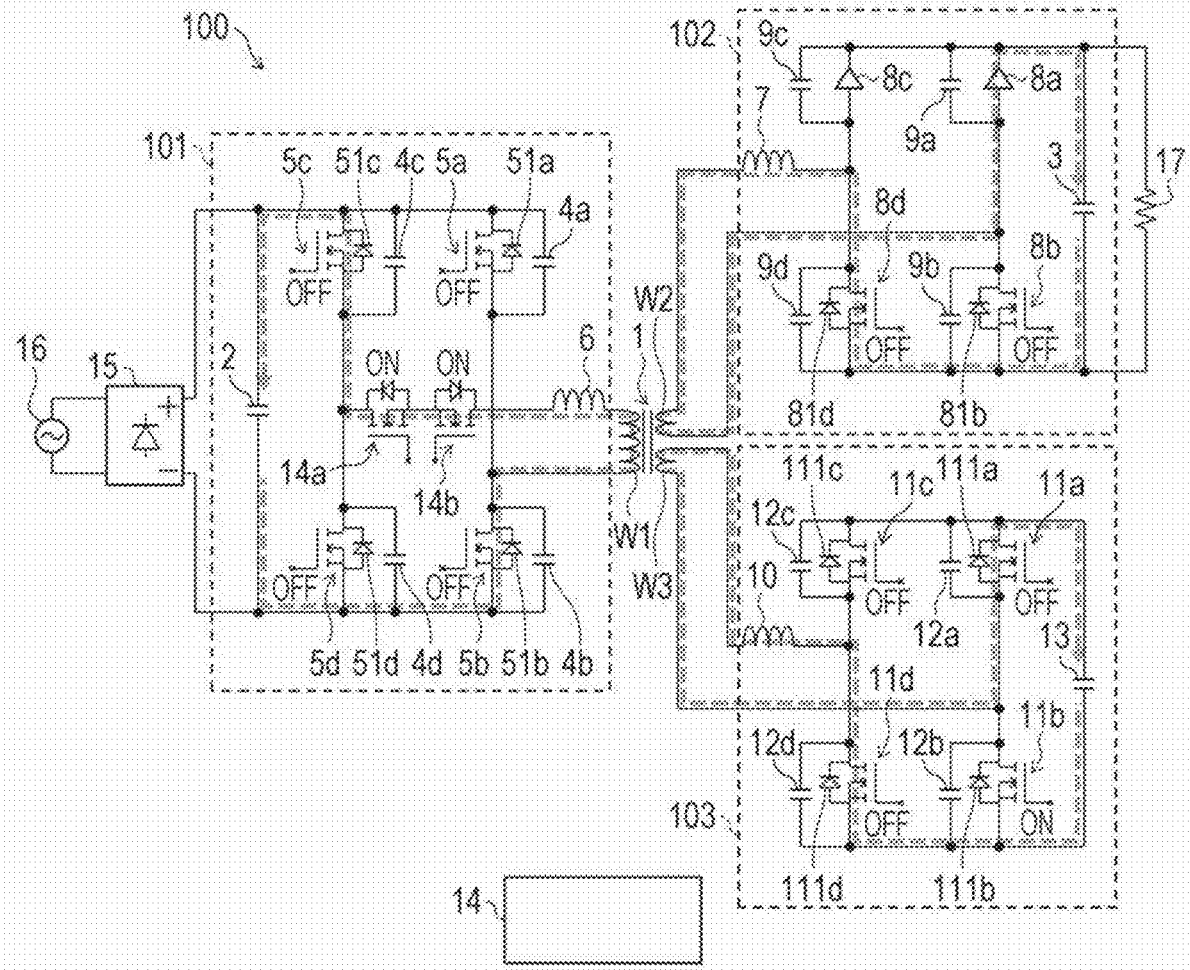

1: TRANSFORMER
2: INPUT CAPACITOR
3: OUTPUT CAPACITOR
4a–4d: FIRST RESONANCE CAPACITOR
5a–5d: FIRST SWITCHING ELEMENT
6: FIRST COIL
7: SECOND COIL
8a, 8c: RECTIFYING DIODE
8b, 8d: SECOND SWITCHING ELEMENT
9a–9d: SECOND RESONANCE CAPACITOR
10: THIRD COIL
11a–11d: THIRD SWITCHING ELEMENT
12a–12d: THIRD RESONANCE CAPACITOR
13: TERTIARY CAPACITOR
14: CONTROL UNIT 14a, 14b: BIDIRECTIONAL SWITCH
15: RECTIFIER CIRCUIT
16: AC POWER SOURCE
17: LOAD
51a–51d: FIRST DIODE
81b, 81d: SECOND DIODE
100: CONVERTER
101: PRIMARY CONVERTER
102: SECONDARY CONVERTER
103: TERTIARY CONVERTER
111a–111d: THIRD DIODE
W1: PRIMARY WINDING
W2: SECONDARY WINDING
W3: TERTIARY WINDING

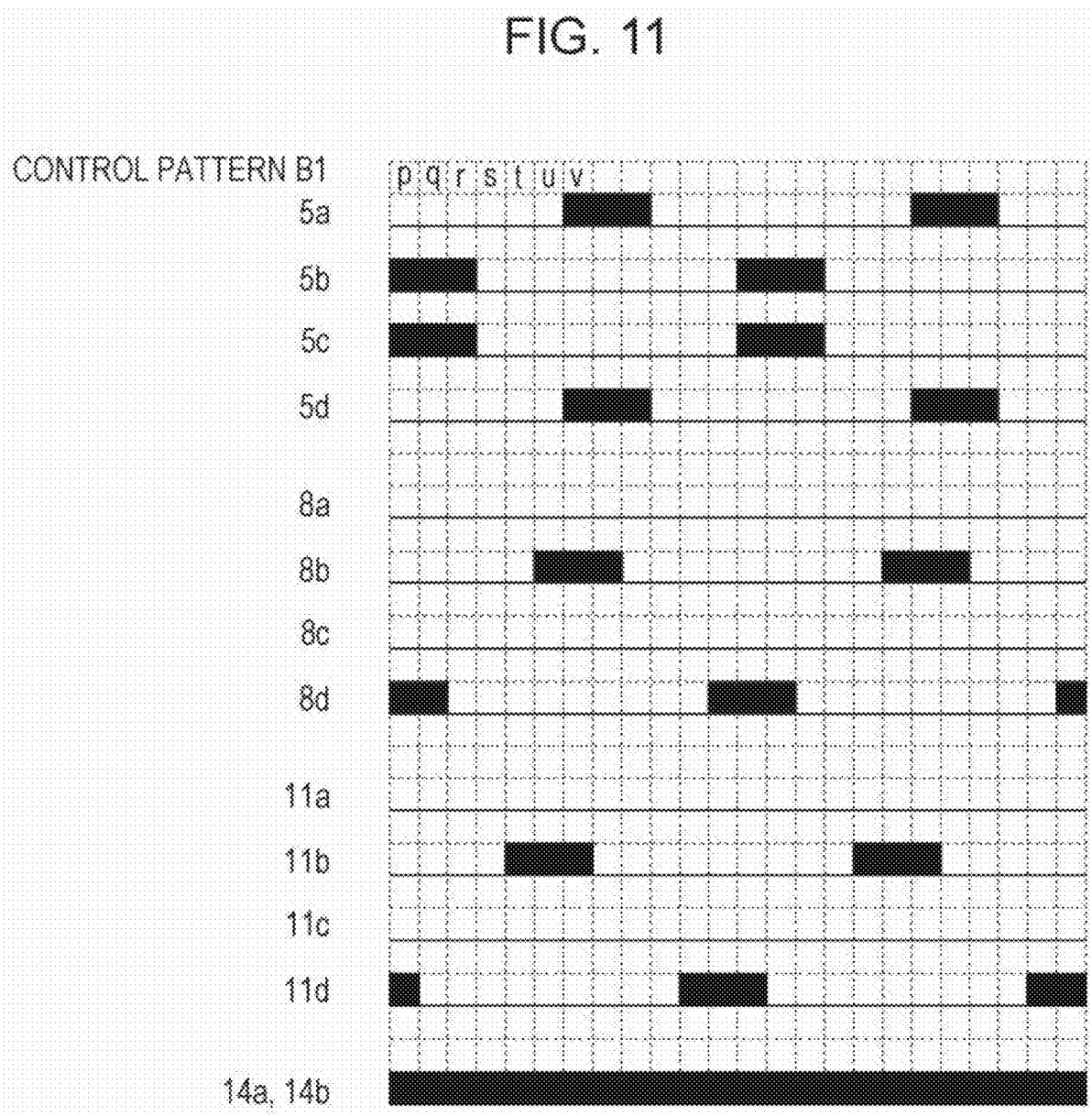

FIG. 12

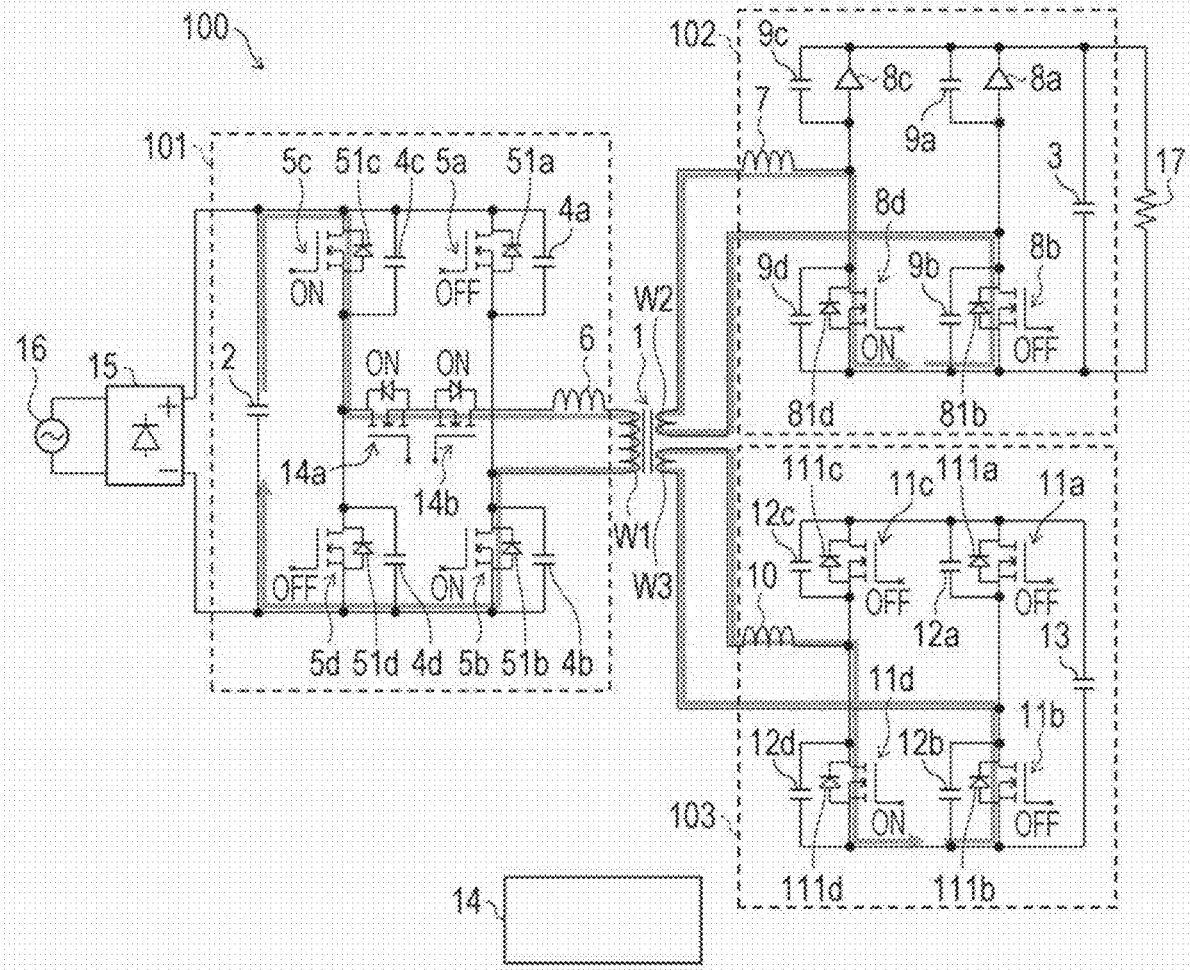

1: TRANSFORMER
2: INPUT CAPACITOR
3: OUTPUT CAPACITOR
4a-4d: FIRST RESONANCE CAPACITOR
5a-5d: FIRST SWITCHING ELEMENT
6: FIRST COIL
7: SECOND COIL
8a, 8c: RECTIFYING DIODE
8b, 8d: SECOND SWITCHING ELEMENT
9a-9d: SECOND RESONANCE CAPACITOR
10: THIRD COIL
11a-11d: THIRD SWITCHING ELEMENT
12a-12d: THIRD RESONANCE CAPACITOR
13: TERTIARY CAPACITOR
14: CONTROL UNIT
14a, 14b: BIDIRECTIONAL SWITCH
15: RECTIFIER CIRCUIT
16: AC POWER SOURCE
17: LOAD
51a-51d: FIRST DIODE
81b, 81d: SECOND DIODE
100: CONVERTER
101: PRIMARY CONVERTER
102: SECONDARY CONVERTER
103: TERTIARY CONVERTER
111a-111d: THIRD DIODE
W1: PRIMARY WINDING
W2: SECONDARY WINDING
W3: TERTIARY WINDING

FIG. 13

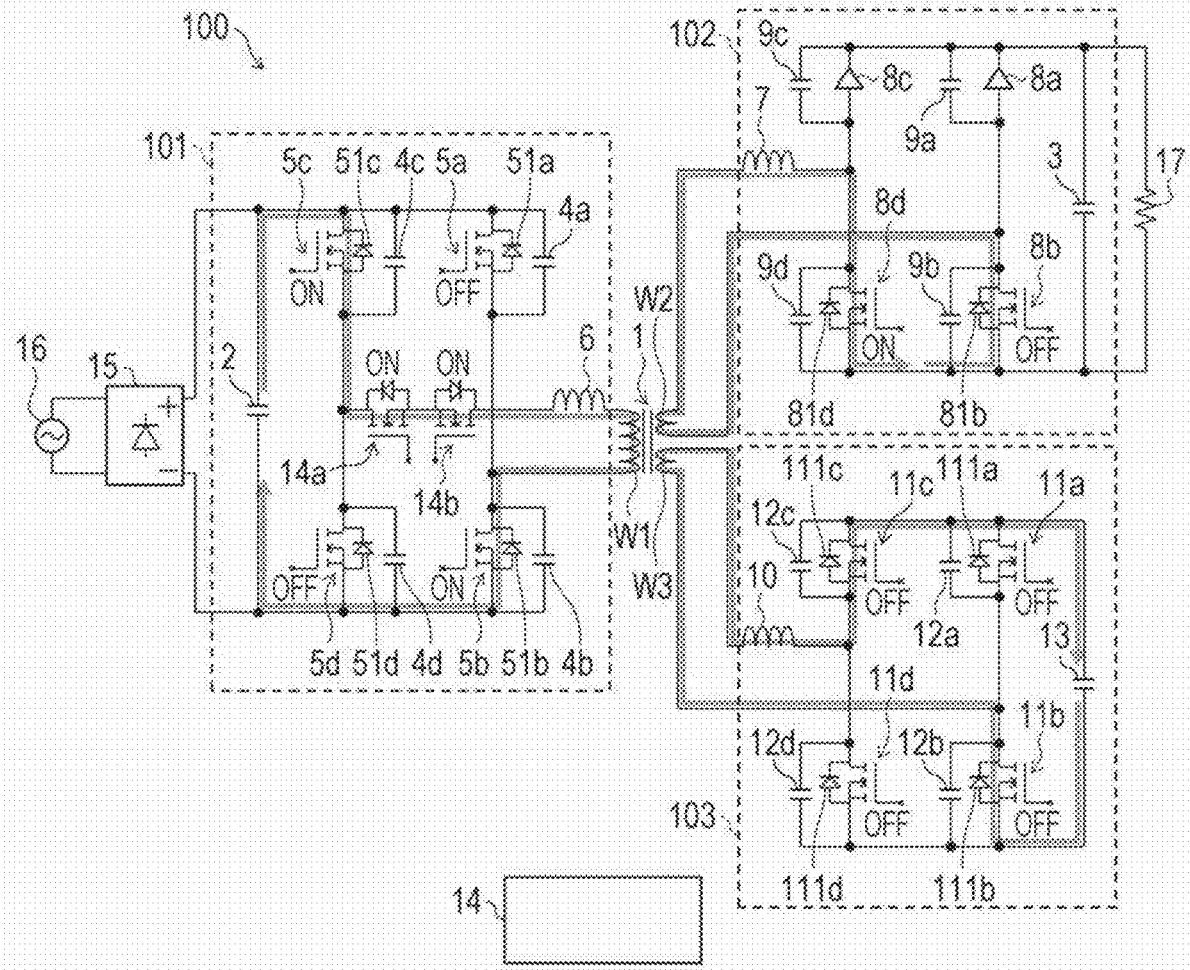

1: TRANSFORMER
2: INPUT CAPACITOR
3: OUTPUT CAPACITOR
4a–4d: FIRST RESONANCE CAPACITOR
5a–5d: FIRST SWITCHING ELEMENT
6: FIRST COIL
7: SECOND COIL
8a, 8c: RECTIFYING DIODE
8b, 8d: SECOND SWITCHING ELEMENT
9a–9d: SECOND RESONANCE CAPACITOR
10: THIRD COIL
11a–11d: THIRD SWITCHING ELEMENT
12a–12d: THIRD RESONANCE CAPACITOR
13: TERTIARY CAPACITOR
14: CONTROL UNIT 14a, 14b: BIDIRECTIONAL SWITCH
15: RECTIFIER CIRCUIT
16: AC POWER SOURCE
17: LOAD
51a–51d: FIRST DIODE
81b, 81d: SECOND DIODE
100: CONVERTER
101: PRIMARY CONVERTER
102: SECONDARY CONVERTER
103: TERTIARY CONVERTER
111a–111d: THIRD DIODE
W1: PRIMARY WINDING
W2: SECONDARY WINDING
W3: TERTIARY WINDING

FIG. 15

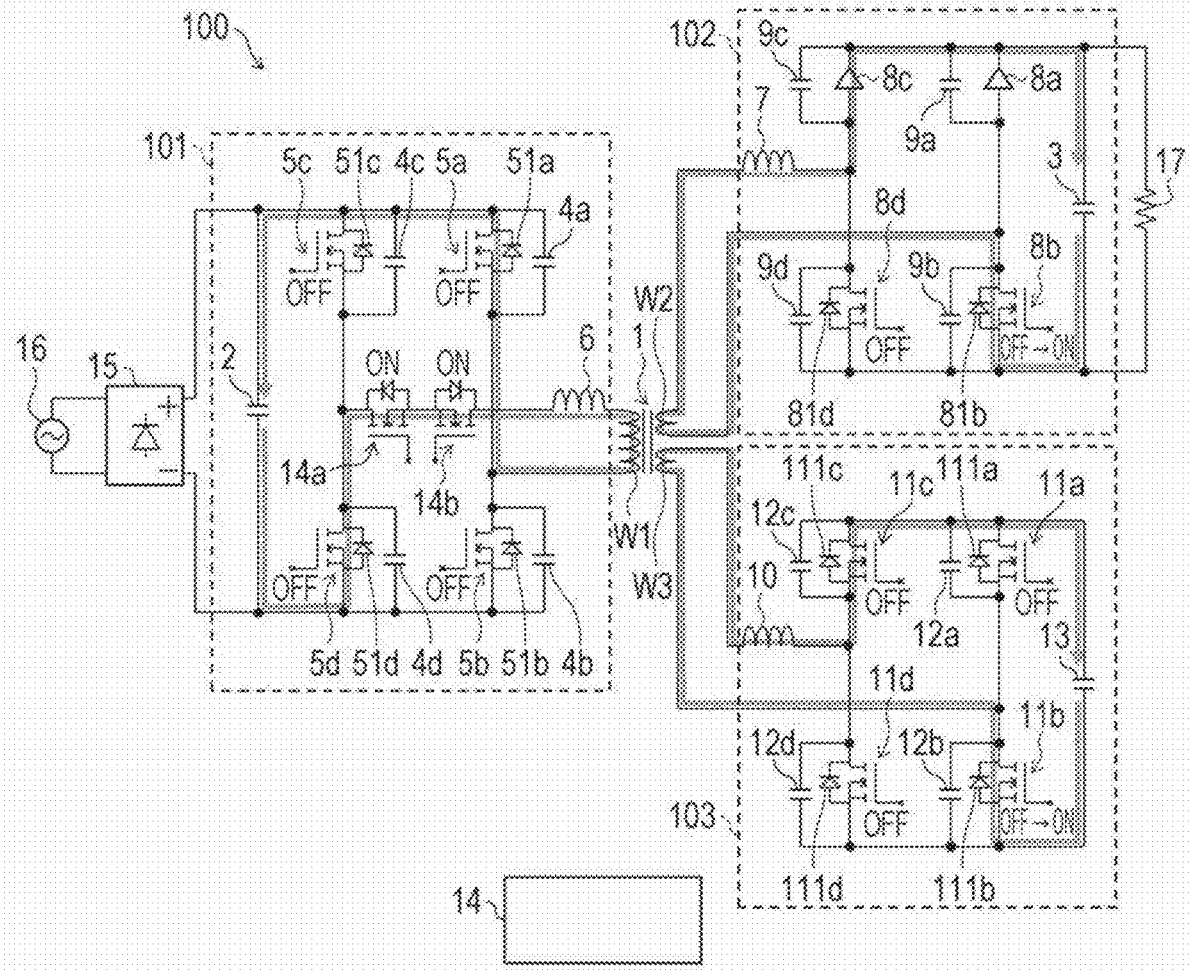

1: TRANSFORMER
2: INPUT CAPACITOR
3: OUTPUT CAPACITOR
4a–4d: FIRST RESONANCE CAPACITOR
5a–5d: FIRST SWITCHING ELEMENT
6: FIRST COIL
7: SECOND COIL
8a, 8c: RECTIFYING DIODE
8b, 8d: SECOND SWITCHING ELEMENT
9a–9d: SECOND RESONANCE CAPACITOR
10: THIRD COIL
11a–11d: THIRD SWITCHING ELEMENT
12a–12d: THIRD RESONANCE CAPACITOR
13: TERTIARY CAPACITOR
14: CONTROL UNIT
14a, 14b: BIDIRECTIONAL SWITCH
15: RECTIFIER CIRCUIT
16: AC POWER SOURCE
17: LOAD
51a–51d: FIRST DIODE
81b, 81d: SECOND DIODE
100: CONVERTER
101: PRIMARY CONVERTER
102: SECONDARY CONVERTER
103: TERTIARY CONVERTER
111a–111d: THIRD DIODE
W1: PRIMARY WINDING
W2: SECONDARY WINDING
W3: TERTIARY WINDING

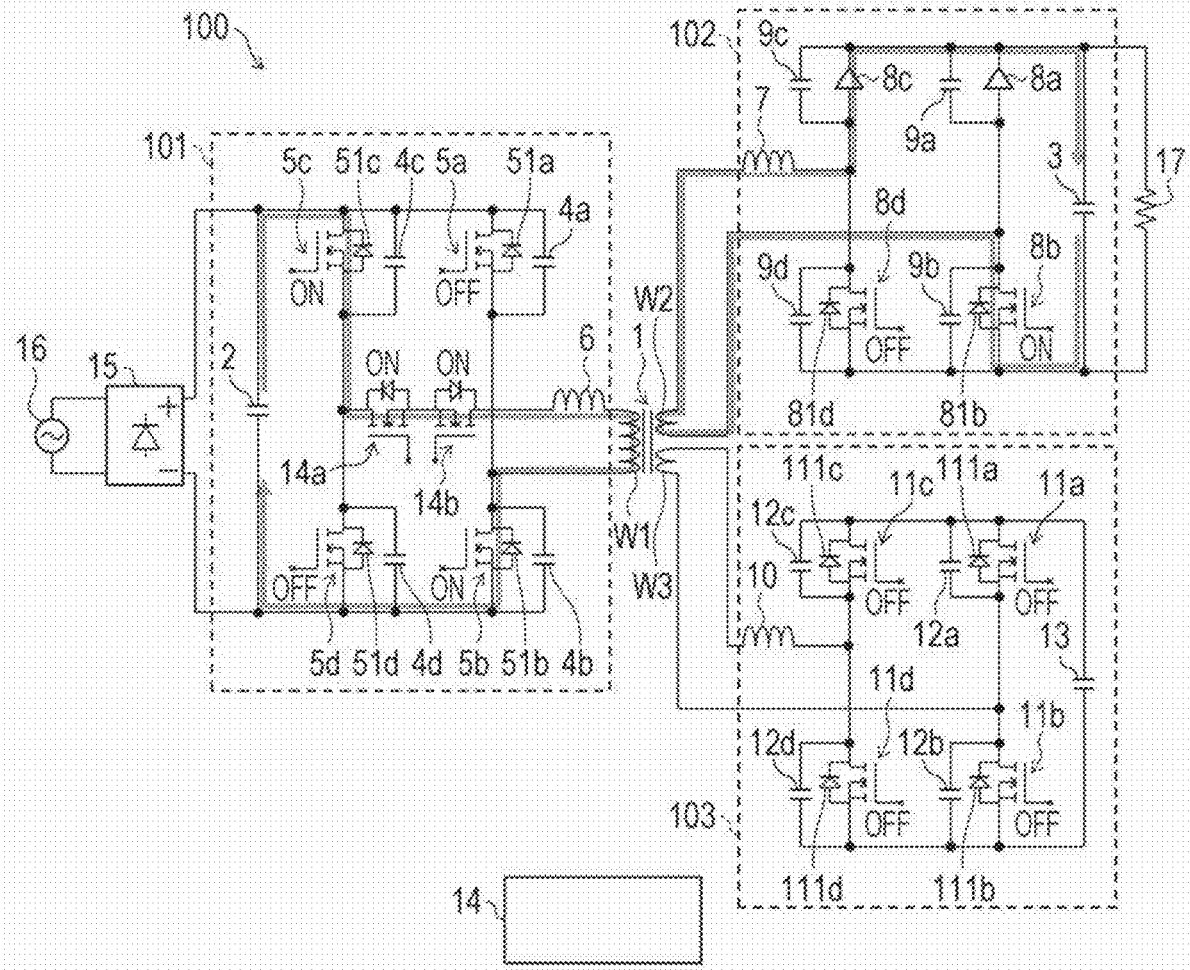

1: TRANSFORMER
2: INPUT CAPACITOR
3: OUTPUT CAPACITOR
4a-4d: FIRST RESONANCE CAPACITOR
5a-5d: FIRST SWITCHING ELEMENT
6: FIRST COIL
7: SECOND COIL
8a, 8c: RECTIFYING DIODE
8b, 8d: SECOND SWITCHING ELEMENT
9a-9d: SECOND RESONANCE CAPACITOR
10: THIRD COIL
11a-11d: THIRD SWITCHING ELEMENT
12a-12d: THIRD RESONANCE CAPACITOR
13: TERTIARY CAPACITOR
14: CONTROL UNIT
14a, 14b: BIDIRECTIONAL SWITCH
15: RECTIFIER CIRCUIT
16: AC POWER SOURCE
17: LOAD
51a-51d: FIRST DIODE
81b, 81d: SECOND DIODE
100: CONVERTER
101: PRIMARY CONVERTER
102: SECONDARY CONVERTER
103: TERTIARY CONVERTER
111a-111d: THIRD DIODE
W1: PRIMARY WINDING
W2: SECONDARY WINDING
W3: TERTIARY WINDING

FIG. 18

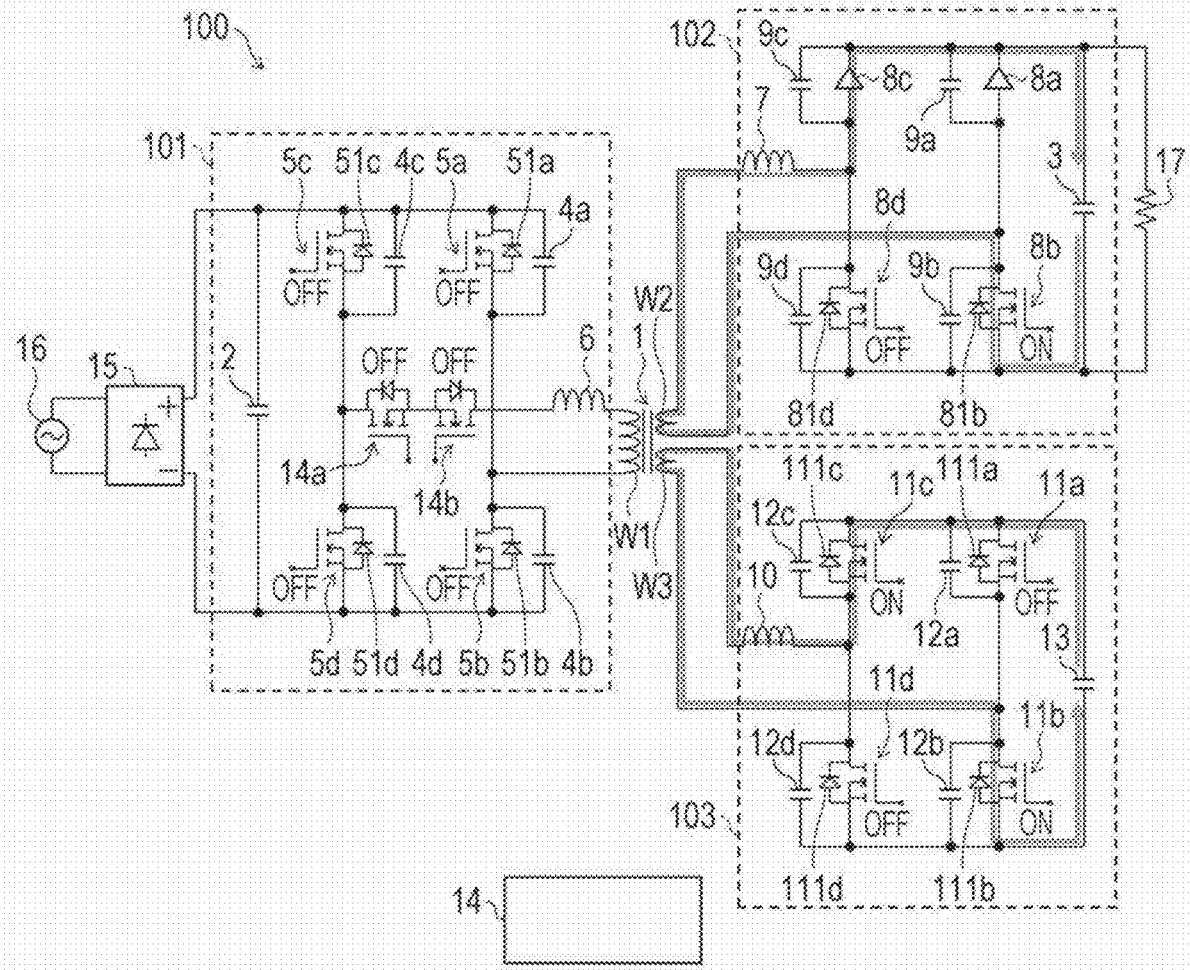

1: TRANSFORMER
2: INPUT CAPACITOR
3: OUTPUT CAPACITOR
4a-4d: FIRST RESONANCE CAPACITOR
5a-5d: FIRST SWITCHING ELEMENT
6: FIRST COIL
7: SECOND COIL
8a, 8c: RECTIFYING DIODE
8b, 8d: SECOND SWITCHING ELEMENT
9a-9d: SECOND RESONANCE CAPACITOR
10: THIRD COIL
11a-11d: THIRD SWITCHING ELEMENT
12a-12d: THIRD RESONANCE CAPACITOR
13: TERTIARY CAPACITOR
14: CONTROL UNIT
14a, 14b: BIDIRECTIONAL SWITCH
15: RECTIFIER CIRCUIT
16: AC POWER SOURCE
17: LOAD
51a-51d: FIRST DIODE
81b, 81d: SECOND DIODE
100: CONVERTER
101: PRIMARY CONVERTER
102: SECONDARY CONVERTER
103: TERTIARY CONVERTER
111a-111d: THIRD DIODE
W1: PRIMARY WINDING
W2: SECONDARY WINDING
W3: TERTIARY WINDING

FIG. 19

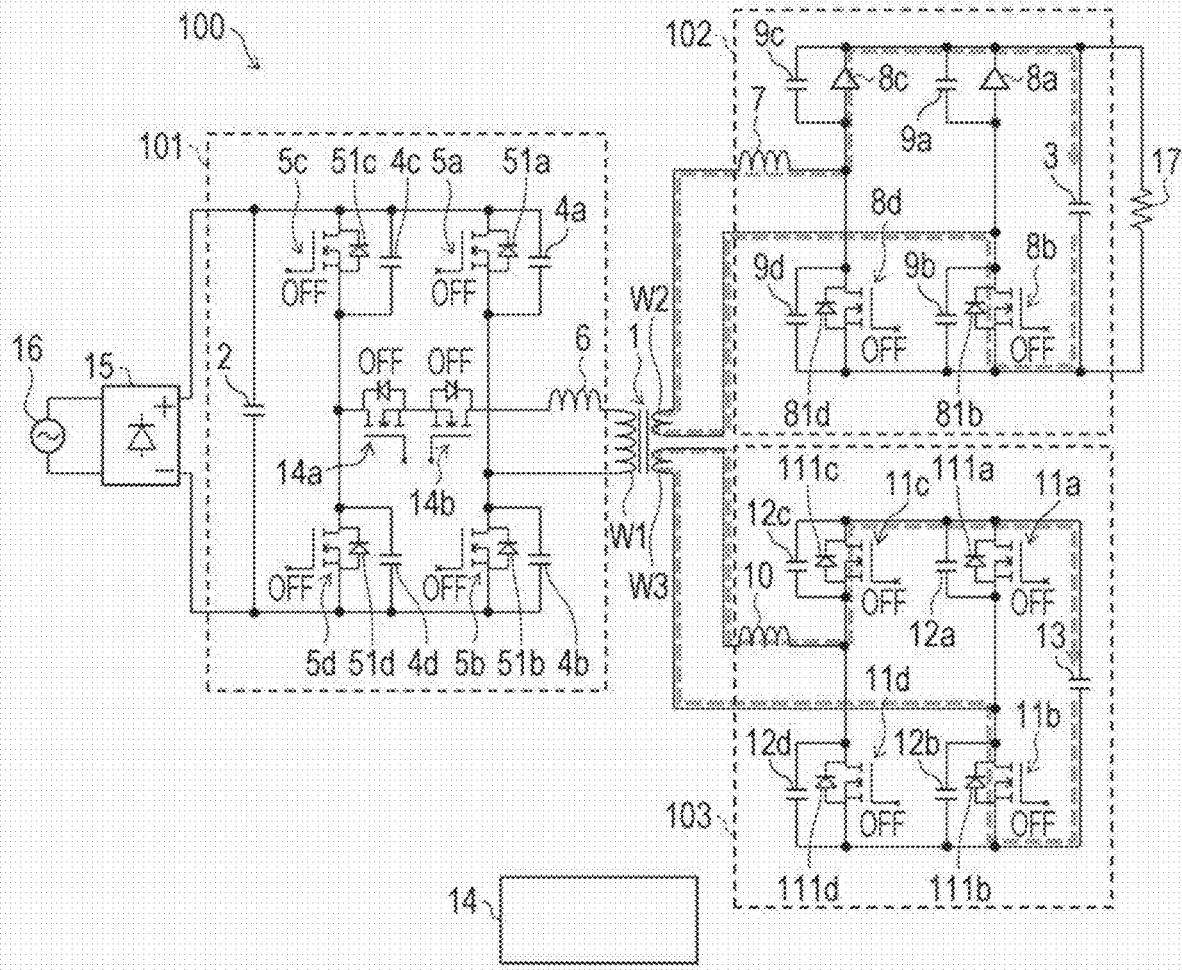

1: TRANSFORMER
2: INPUT CAPACITOR
3: OUTPUT CAPACITOR
4a–4d: FIRST RESONANCE CAPACITOR
5a–5d: FIRST SWITCHING ELEMENT
6: FIRST COIL
7: SECOND COIL
8a, 8c: RECTIFYING DIODE
8b, 8d: SECOND SWITCHING ELEMENT
9a–9d: SECOND RESONANCE CAPACITOR
10: THIRD COIL
11a–11d: THIRD SWITCHING ELEMENT
12a–12d: THIRD RESONANCE CAPACITOR
13: TERTIARY CAPACITOR
14: CONTROL UNIT 14a, 14b: BIDIRECTIONAL SWITCH
15: RECTIFIER CIRCUIT
16: AC POWER SOURCE
17: LOAD
51a–51d: FIRST DIODE
81b, 81d: SECOND DIODE
100: CONVERTER
101: PRIMARY CONVERTER
102: SECONDARY CONVERTER
103: TERTIARY CONVERTER
111a–111d: THIRD DIODE
W1: PRIMARY WINDING
W2: SECONDARY WINDING
W3: TERTIARY WINDING

FIG. 20

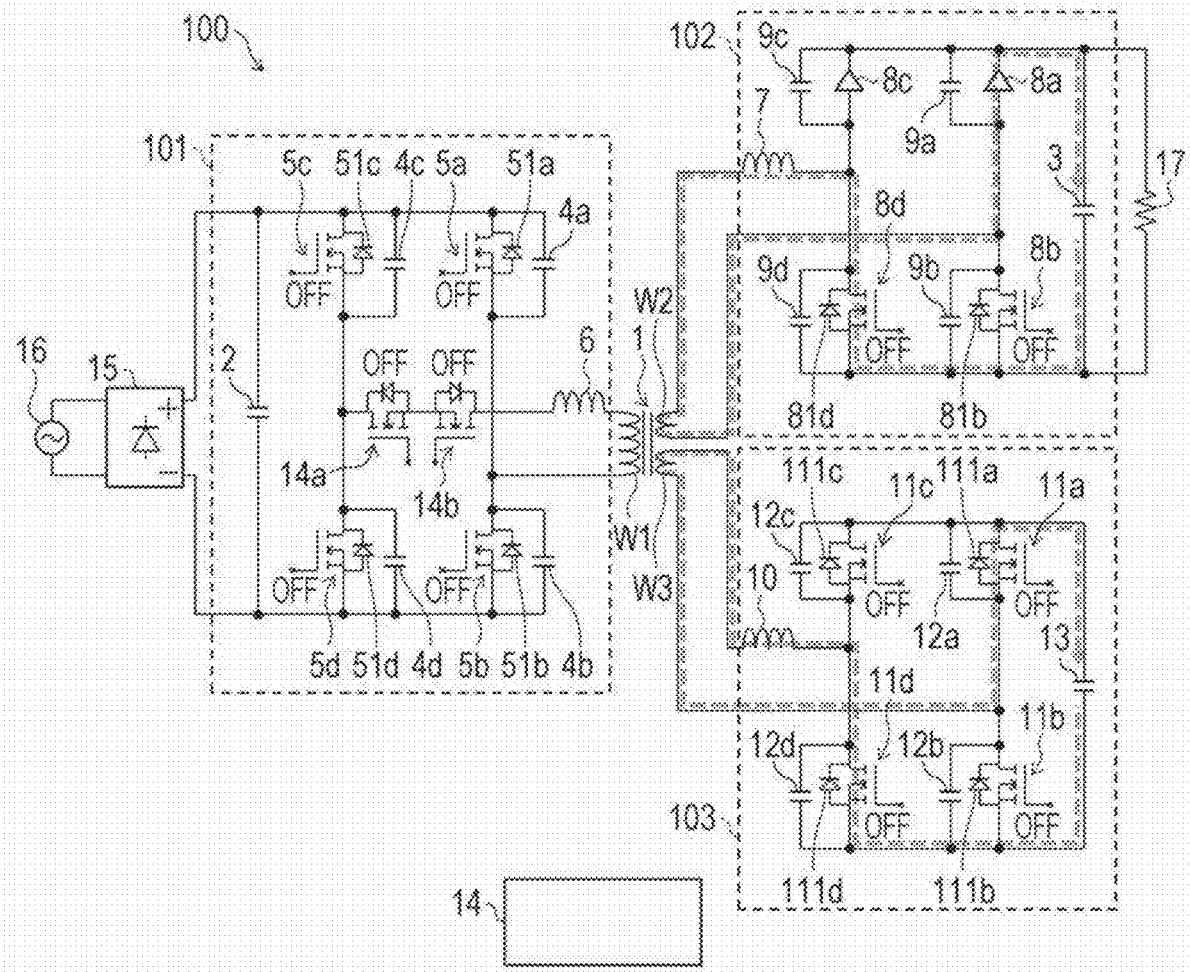

1: TRANSFORMER
2: INPUT CAPACITOR
3: OUTPUT CAPACITOR
4a–4d: FIRST RESONANCE CAPACITOR
5a–5d: FIRST SWITCHING ELEMENT
6: FIRST COIL
7: SECOND COIL
8a, 8c: RECTIFYING DIODE
8b, 8d: SECOND SWITCHING ELEMENT
9a–9d: SECOND RESONANCE CAPACITOR
10: THIRD COIL
11a–11d: THIRD SWITCHING ELEMENT
12a–12d: THIRD RESONANCE CAPACITOR
13: TERTIARY CAPACITOR
14: CONTROL UNIT 14a, 14b: BIDIRECTIONAL SWITCH
15: RECTIFIER CIRCUIT
16: AC POWER SOURCE
17: LOAD
51a–51d: FIRST DIODE
81b, 81d: SECOND DIODE
100: CONVERTER
101: PRIMARY CONVERTER
102: SECONDARY CONVERTER
103: TERTIARY CONVERTER
111a–111d: THIRD DIODE
W1: PRIMARY WINDING
W2: SECONDARY WINDING
W3: TERTIARY WINDING

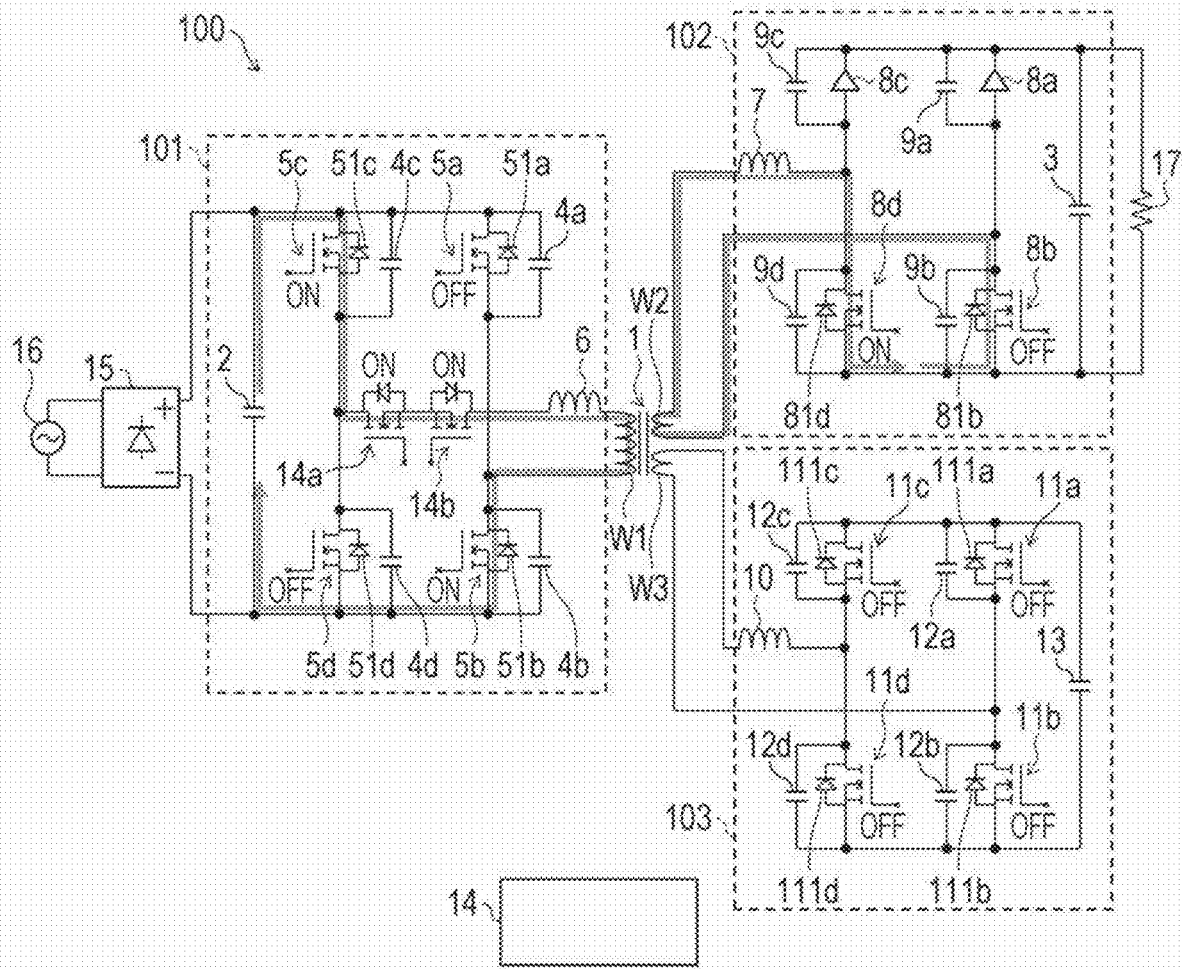

1: TRANSFORMER
2: INPUT CAPACITOR
3: OUTPUT CAPACITOR
4a-4d: FIRST RESONANCE CAPACITOR
5a-5d: FIRST SWITCHING ELEMENT
6: FIRST COIL
7: SECOND COIL
8a, 8c: RECTIFYING DIODE
8b, 8d: SECOND SWITCHING ELEMENT
9a-9d: SECOND RESONANCE CAPACITOR
10: THIRD COIL
11a-11d: THIRD SWITCHING ELEMENT
12a-12d: THIRD RESONANCE CAPACITOR
13: TERTIARY CAPACITOR
14: CONTROL UNIT
14a, 14b: BIDIRECTIONAL SWITCH
15: RECTIFIER CIRCUIT
16: AC POWER SOURCE
17: LOAD
51a-51d: FIRST DIODE
81b, 81d: SECOND DIODE
100: CONVERTER
101: PRIMARY CONVERTER
102: SECONDARY CONVERTER
103: TERTIARY CONVERTER
111a-111d: THIRD DIODE
W1: PRIMARY WINDING
W2: SECONDARY WINDING
W3: TERTIARY WINDING

FIG. 23

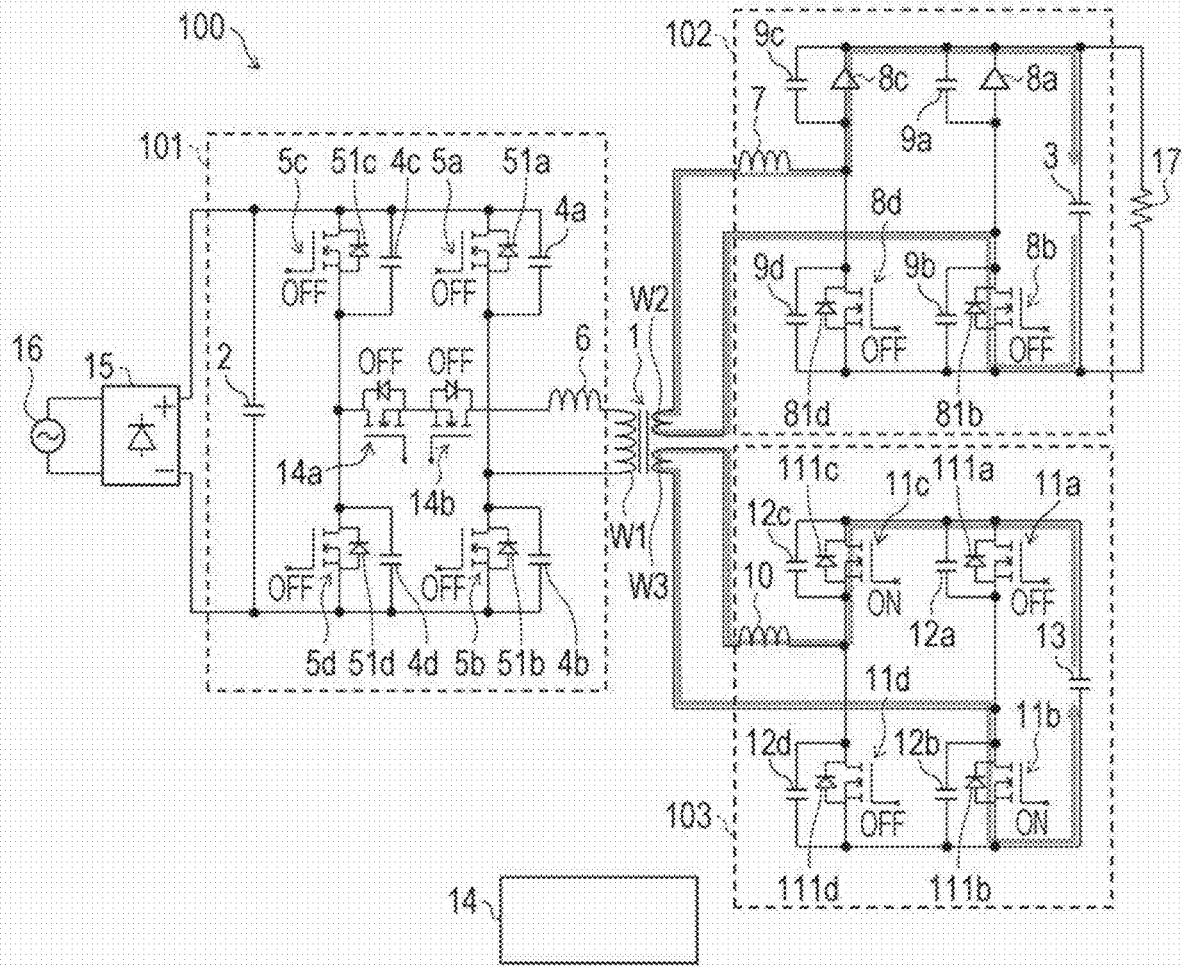

1: TRANSFORMER
2: INPUT CAPACITOR
3: OUTPUT CAPACITOR
4a-4d: FIRST RESONANCE CAPACITOR
5a-5d: FIRST SWITCHING ELEMENT
6: FIRST COIL
7: SECOND COIL
8a, 8c: RECTIFYING DIODE
8b, 8d: SECOND SWITCHING ELEMENT
9a-9d: SECOND RESONANCE CAPACITOR
10: THIRD COIL
11a-11d: THIRD SWITCHING ELEMENT
12a-12d: THIRD RESONANCE CAPACITOR
13: TERTIARY CAPACITOR
14: CONTROL UNIT
14a, 14b: BIDIRECTIONAL SWITCH
15: RECTIFIER CIRCUIT
16: AC POWER SOURCE
17: LOAD
51a-51d: FIRST DIODE
81b, 81d: SECOND DIODE
100: CONVERTER
101: PRIMARY CONVERTER
102: SECONDARY CONVERTER
103: TERTIARY CONVERTER
111a-111d: THIRD DIODE
W1: PRIMARY WINDING
W2: SECONDARY WINDING
W3: TERTIARY WINDING

FIG. 25

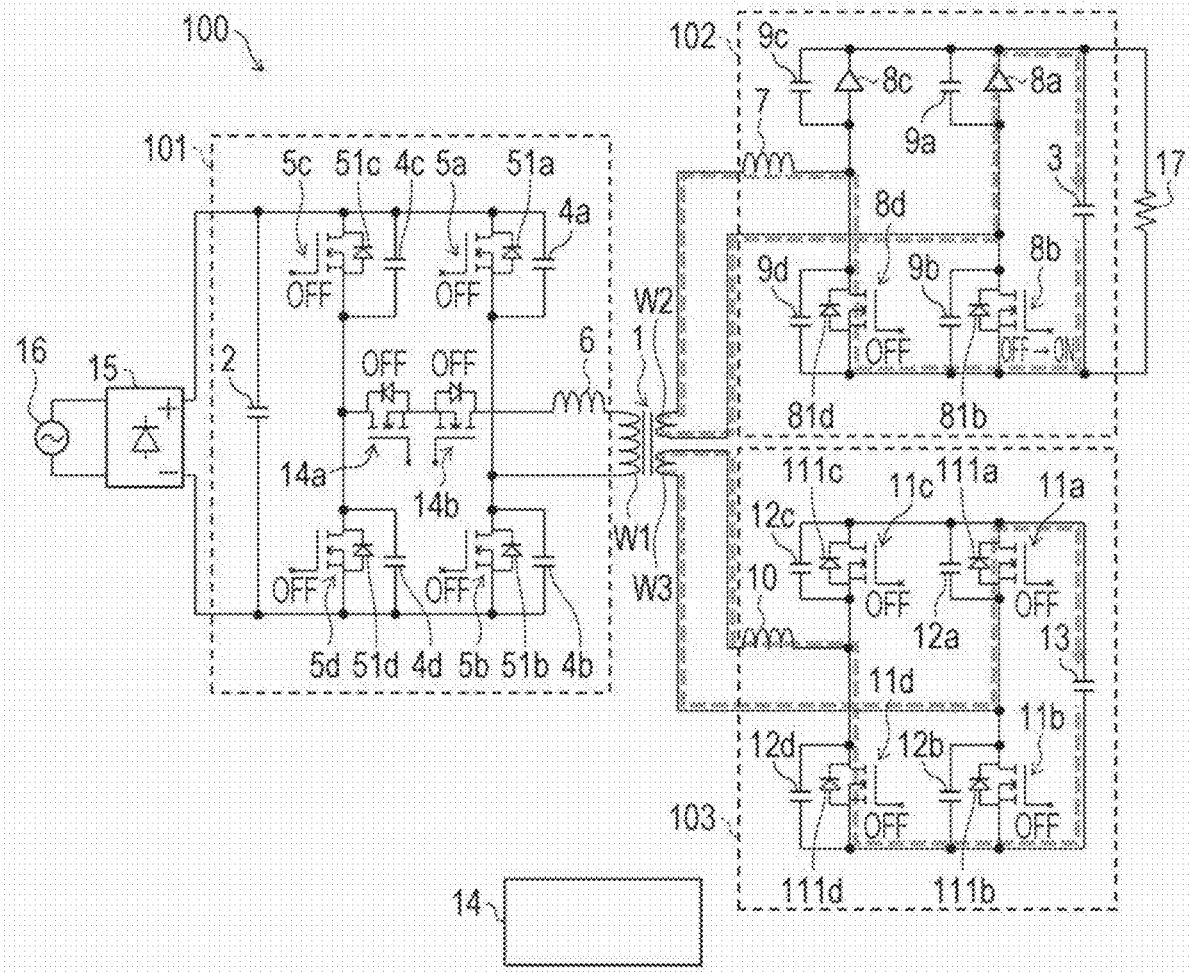

1: TRANSFORMER
2: INPUT CAPACITOR
3: OUTPUT CAPACITOR
4a–4d: FIRST RESONANCE CAPACITOR
5a–5d: FIRST SWITCHING ELEMENT
6: FIRST COIL
7: SECOND COIL
8a, 8c: RECTIFYING DIODE
8b, 8d: SECOND SWITCHING ELEMENT
9a–9d: SECOND RESONANCE CAPACITOR
10: THIRD COIL
11a–11d: THIRD SWITCHING ELEMENT
12a–12d: THIRD RESONANCE CAPACITOR
13: TERTIARY CAPACITOR
14: CONTROL UNIT
14a, 14b: BIDIRECTIONAL SWITCH
15: RECTIFIER CIRCUIT
16: AC POWER SOURCE
17: LOAD
51a–51d: FIRST DIODE
81b, 81d: SECOND DIODE
100: CONVERTER
101: PRIMARY CONVERTER
102: SECONDARY CONVERTER
103: TERTIARY CONVERTER
111a–111d: THIRD DIODE
W1: PRIMARY WINDING
W2: SECONDARY WINDING
W3: TERTIARY WINDING

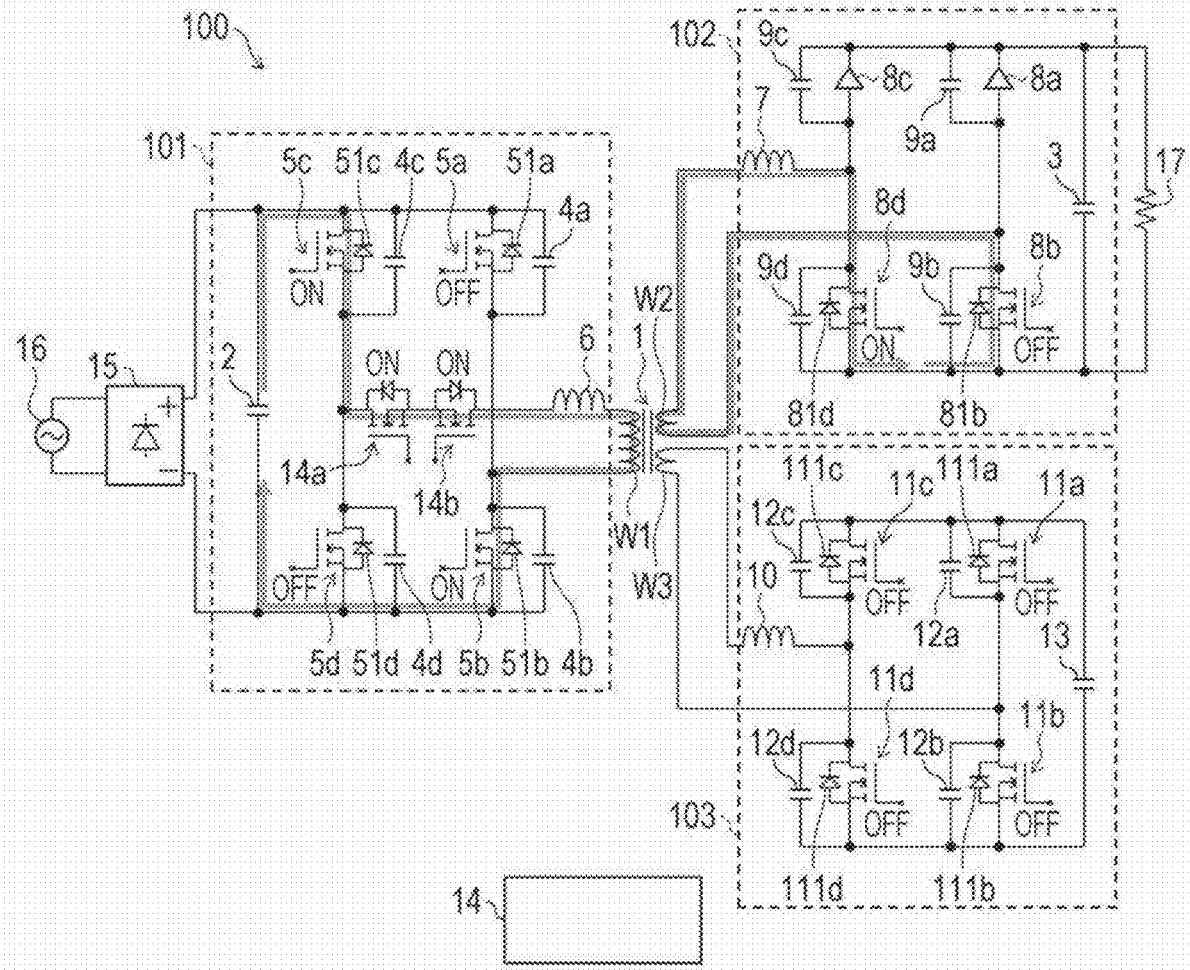

1: TRANSFORMER
2: INPUT CAPACITOR
3: OUTPUT CAPACITOR
4a-4d: FIRST RESONANCE CAPACITOR
5a-5d: FIRST SWITCHING ELEMENT
6: FIRST COIL
7: SECOND COIL
8a, 8c: RECTIFYING DIODE
8b, 8d: SECOND SWITCHING ELEMENT
9a-9d: SECOND RESONANCE CAPACITOR
10: THIRD COIL
11a-11d: THIRD SWITCHING ELEMENT
12a-12d: THIRD RESONANCE CAPACITOR
13: TERTIARY CAPACITOR
14: CONTROL UNIT 14a, 14b: BIDIRECTIONAL SWITCH
15: RECTIFIER CIRCUIT
16: AC POWER SOURCE
17: LOAD
51a-51d: FIRST DIODE
81b, 81d: SECOND DIODE
100: CONVERTER
101: PRIMARY CONVERTER
102: SECONDARY CONVERTER
103: TERTIARY CONVERTER
111a-111d: THIRD DIODE
W1: PRIMARY WINDING
W2: SECONDARY WINDING
W3: TERTIARY WINDING

FIG. 28

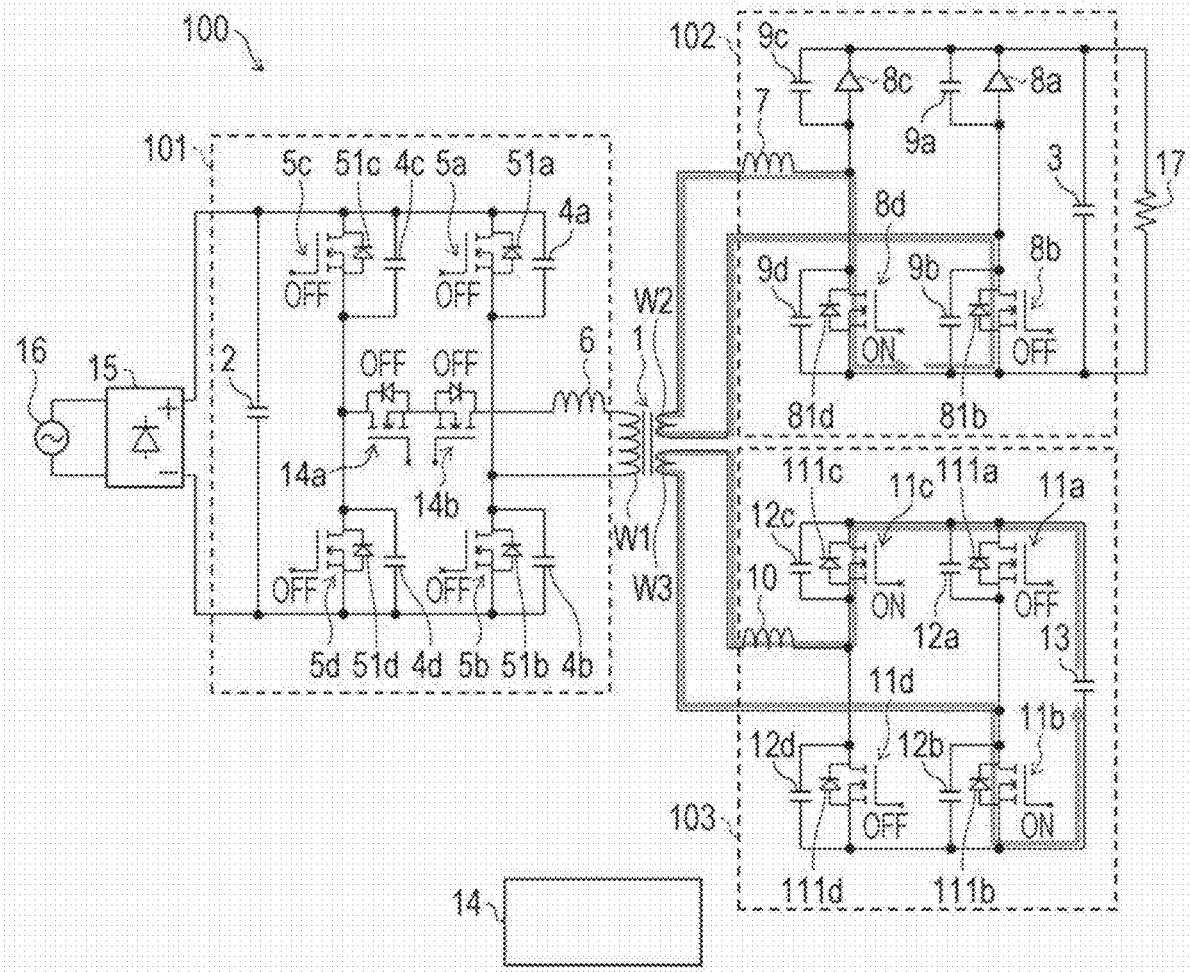

1: TRANSFORMER
2: INPUT CAPACITOR
3: OUTPUT CAPACITOR
4a–4d: FIRST RESONANCE CAPACITOR
5a–5d: FIRST SWITCHING ELEMENT
6: FIRST COIL
7: SECOND COIL
8a, 8c: RECTIFYING DIODE
8b, 8d: SECOND SWITCHING ELEMENT
9a–9d: SECOND RESONANCE CAPACITOR
10: THIRD COIL
11a–11d: THIRD SWITCHING ELEMENT
12a–12d: THIRD RESONANCE CAPACITOR
13: TERTIARY CAPACITOR
14: CONTROL UNIT
14a, 14b: BIDIRECTIONAL SWITCH
15: RECTIFIER CIRCUIT
16: AC POWER SOURCE
17: LOAD
51a–51d: FIRST DIODE
81b, 81d: SECOND DIODE
100: CONVERTER
101: PRIMARY CONVERTER
102: SECONDARY CONVERTER
103: TERTIARY CONVERTER
111a–111d: THIRD DIODE
W1: PRIMARY WINDING
W2: SECONDARY WINDING
W3: TERTIARY WINDING

FIG. 29

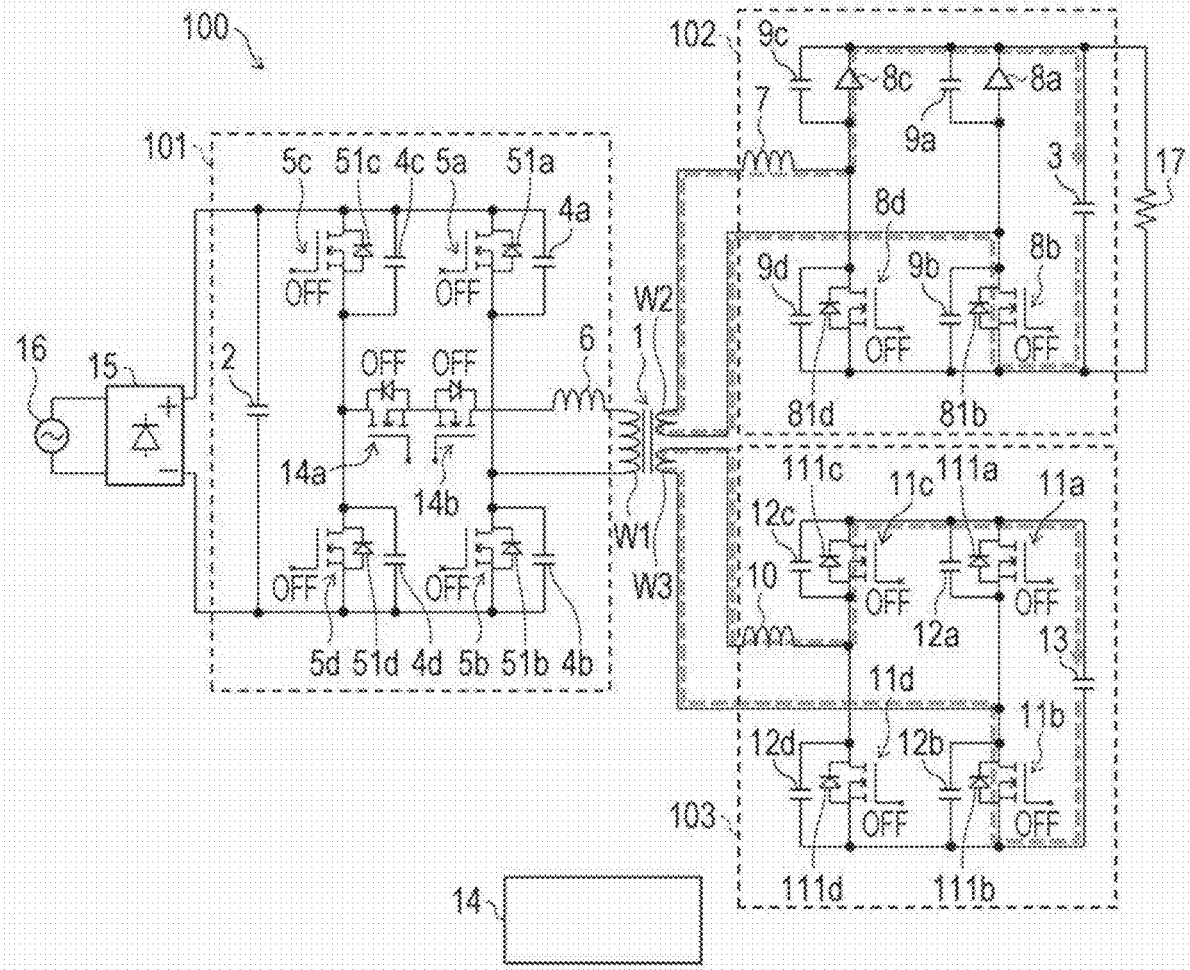

1: TRANSFORMER
2: INPUT CAPACITOR
3: OUTPUT CAPACITOR
4a-4d: FIRST RESONANCE CAPACITOR
5a-5d: FIRST SWITCHING ELEMENT
6: FIRST COIL
7: SECOND COIL
8a, 8c: RECTIFYING DIODE
8b, 8d: SECOND SWITCHING ELEMENT
9a-9d: SECOND RESONANCE CAPACITOR
10: THIRD COIL
11a-11d: THIRD SWITCHING ELEMENT
12a-12d: THIRD RESONANCE CAPACITOR
13: TERTIARY CAPACITOR
14: CONTROL UNIT
14a, 14b: BIDIRECTIONAL SWITCH
15: RECTIFIER CIRCUIT
16: AC POWER SOURCE
17: LOAD
51a-51d: FIRST DIODE
81b, 81d: SECOND DIODE
100: CONVERTER
101: PRIMARY CONVERTER
102: SECONDARY CONVERTER
103: TERTIARY CONVERTER
111a-111d: THIRD DIODE
W1: PRIMARY WINDING
W2: SECONDARY WINDING
W3: TERTIARY WINDING

FIG. 30

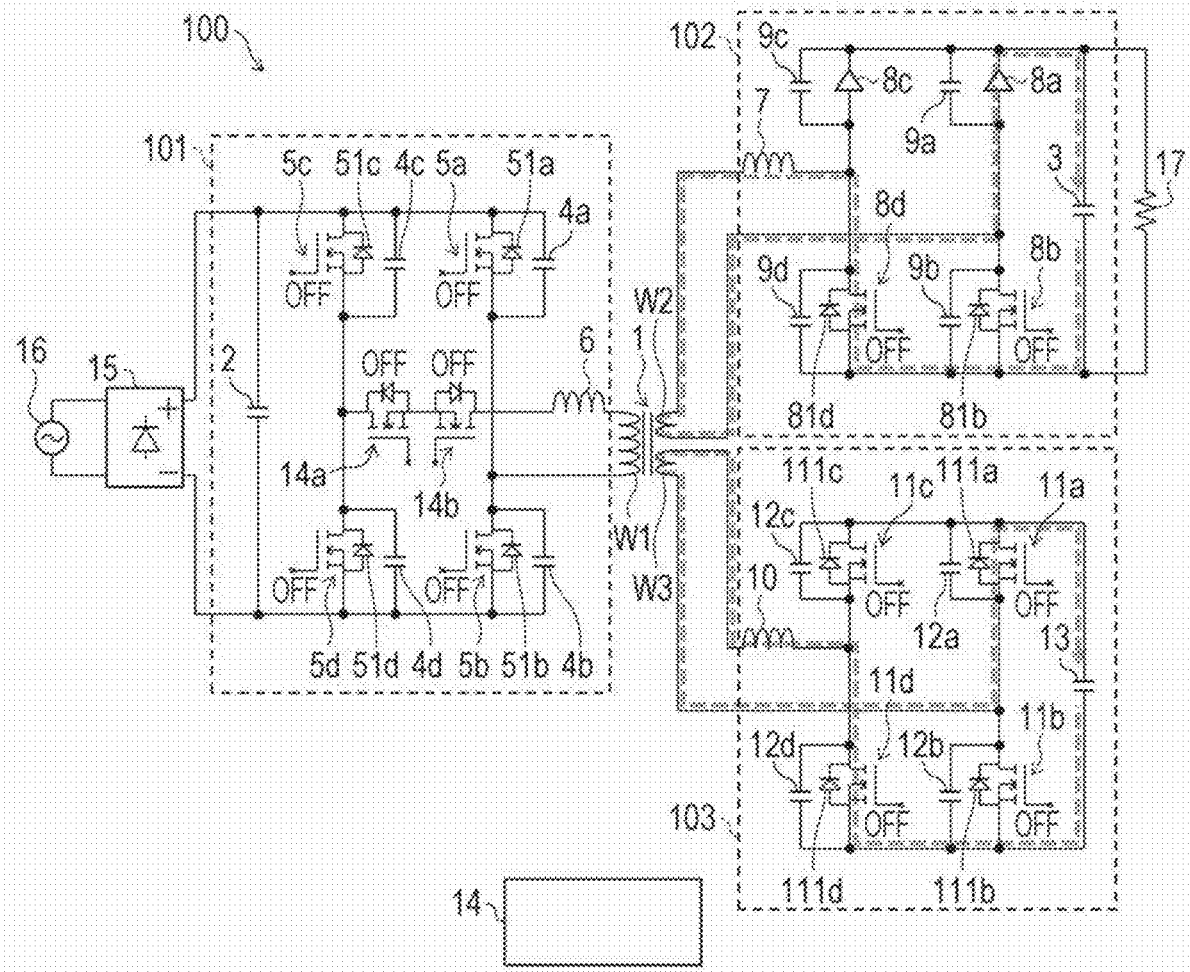

1: TRANSFORMER
2: INPUT CAPACITOR
3: OUTPUT CAPACITOR
4a-4d: FIRST RESONANCE CAPACITOR
5a-5d: FIRST SWITCHING ELEMENT
6: FIRST COIL
7: SECOND COIL
8a, 8c: RECTIFYING DIODE
8b, 8d: SECOND SWITCHING ELEMENT
9a-9d: SECOND RESONANCE CAPACITOR
10: THIRD COIL
11a-11d: THIRD SWITCHING ELEMENT
12a-12d: THIRD RESONANCE CAPACITOR
13: TERTIARY CAPACITOR
14: CONTROL UNIT
14a, 14b: BIDIRECTIONAL SWITCH
15: RECTIFIER CIRCUIT
16: AC POWER SOURCE
17: LOAD
51a-51d: FIRST DIODE
81b, 81d: SECOND DIODE
100: CONVERTER
101: PRIMARY CONVERTER
102: SECONDARY CONVERTER
103: TERTIARY CONVERTER
111a-111d: THIRD DIODE
W1: PRIMARY WINDING
W2: SECONDARY WINDING
W3: TERTIARY WINDING

CONVERTER PROVIDED WITH CONTROL UNIT THAT PERFORMS SWITCHING CONTROL FOR SWITCHING ELEMENTS

TECHNICAL FIELD

The present invention relates to a converter.

BACKGROUND ART

PTL 1 discloses a DC/DC converter provided with a first converter unit connected between a first direct-current (DC) power source and a first winding of a transformer, a second converter unit connected between a second direct-current (DC) power source and a second winding of the transformer, and a control circuit. The control circuit controls semiconductor switching elements inside the first converter unit and the second converter unit.

CITATION LIST

Patent Literature

[PTL 1] Japanese Unexamined Patent Application Publication No. 2014-87134 (published May 12, 2014)

SUMMARY OF INVENTION

Technical Problem

However, with the DC/DC converter disclosed in PTL 1, the input of DC power is anticipated, while the input of alternating-current (AC) power is not anticipated. In the case where AC power is input, improving the power factor of the alternating current is necessary. An object of one aspect of the present invention is to achieve an improvement in the power factor of the input into a primary converter in the case where AC power is input.

Solution to Problem

To address the above issue, (1) an aspect of the present invention is a converter provided with: a transformer having a primary winding, a secondary winding, and a tertiary winding; a primary converter, connected to the primary winding, that includes a plurality of first switching elements; a secondary converter, connected to a load and the secondary winding, that includes a plurality of second switching elements; a tertiary converter, connected to the tertiary winding, that includes a plurality of third switching elements and a capacitor; and a control unit that performs a switching control with respect to the plurality of first switching elements, the plurality of second switching elements, and the plurality of third switching elements such that power is supplied from the primary converter to the secondary converter while keeping a voltage supplied to the load constant, and also such that power is supplied from the primary converter to the tertiary converter while keeping a current supplied to the capacitor constant.

(2) An embodiment of the present invention is a converter in which, in addition to the configuration of (1), the control unit performs the switching control such that power is supplied from the tertiary converter to the secondary converter while keeping a voltage suppled to the load constant.

(3) An embodiment of the present invention is a converter in which, in addition to the configuration of (1) or (2), the control unit performs the switching control such that a power factor between a current input into the primary converter and a voltage input into the primary converter is within a prescribed value.

(4) An embodiment of the present invention is a converter in which, in addition to the configuration of any of (1) to (3), the control unit performs the switching control such that power is supplied from the primary converter to the tertiary converter in a case where a voltage input into the primary converter is a predetermined threshold value or higher, and such that power is suppled from the tertiary converter to the secondary converter in a case where the voltage input into the primary converter is lower than the predetermined threshold value.

(5) An embodiment of the present invention is a converter in which, in addition to the configuration of any of (1) to (4), the control unit performs the switching control such that power is supplied from the tertiary converter to the secondary converter in a state in which power is not input into the primary converter.

(6) An embodiment of the present invention is a converter in which, in addition to the configuration of any of (1) to (5), the control unit performs the switching control such that a switching timing in a case where a current output from the secondary converter to the load is equal to or greater than a predetermined specific value is different from a switching timing in a case where the current output from the secondary converter to the load is less than the predetermined specific value.

(7) An embodiment of the present invention is a converter in which, in addition to the configuration of (6), the control unit performs the switching control such that a switching process in a case where the current output from the secondary converter to the load is equal to or greater than a predetermined specific value is different from a switching process in a case where the current output from the secondary converter to the load is less than the predetermined specific value.

(8) An embodiment of the present invention is a converter in which, in addition to the configuration of any of (1) to (7), in a case where the switching control is performed by the control unit such that power is supplied from the primary converter or the tertiary converter to the secondary converter while keeping a voltage supplied to the load constant, a voltage input into the secondary converter is not more than a maximum value of a voltage tolerance of the load.

(9) An embodiment of the present invention is a converter in which, in addition to the configuration of any of (1) to (8), in a case where the switching control is performed by the control unit such that power is supplied from the primary converter to the tertiary converter while keeping a current supplied to the capacitor constant, a voltage input into the tertiary converter is less than a minimum value of a voltage range in which current flows to the capacitor.

Advantageous Effects of Invention

According to one aspect of the present invention, an improvement in the power factor of the input into a primary converter can be achieved in the case where AC power is input.

BRIEF DESCRIPTION OF DRAWINGS

FIG. 1 is a circuit diagram illustrating a configuration of a converter according to Embodiment 1 of the present invention.

FIG. 4A is a table illustrating modes of switching control by the control unit in a case where power is supplied from a primary converter to a secondary converter and power is supplied from the primary converter to a tertiary converter, while FIG. 4B is a table illustrating modes of switching control by the control unit in a case where power is supplied from the primary converter to the secondary converter and power is supplied from the tertiary converter to the secondary converter.

Figure 5:
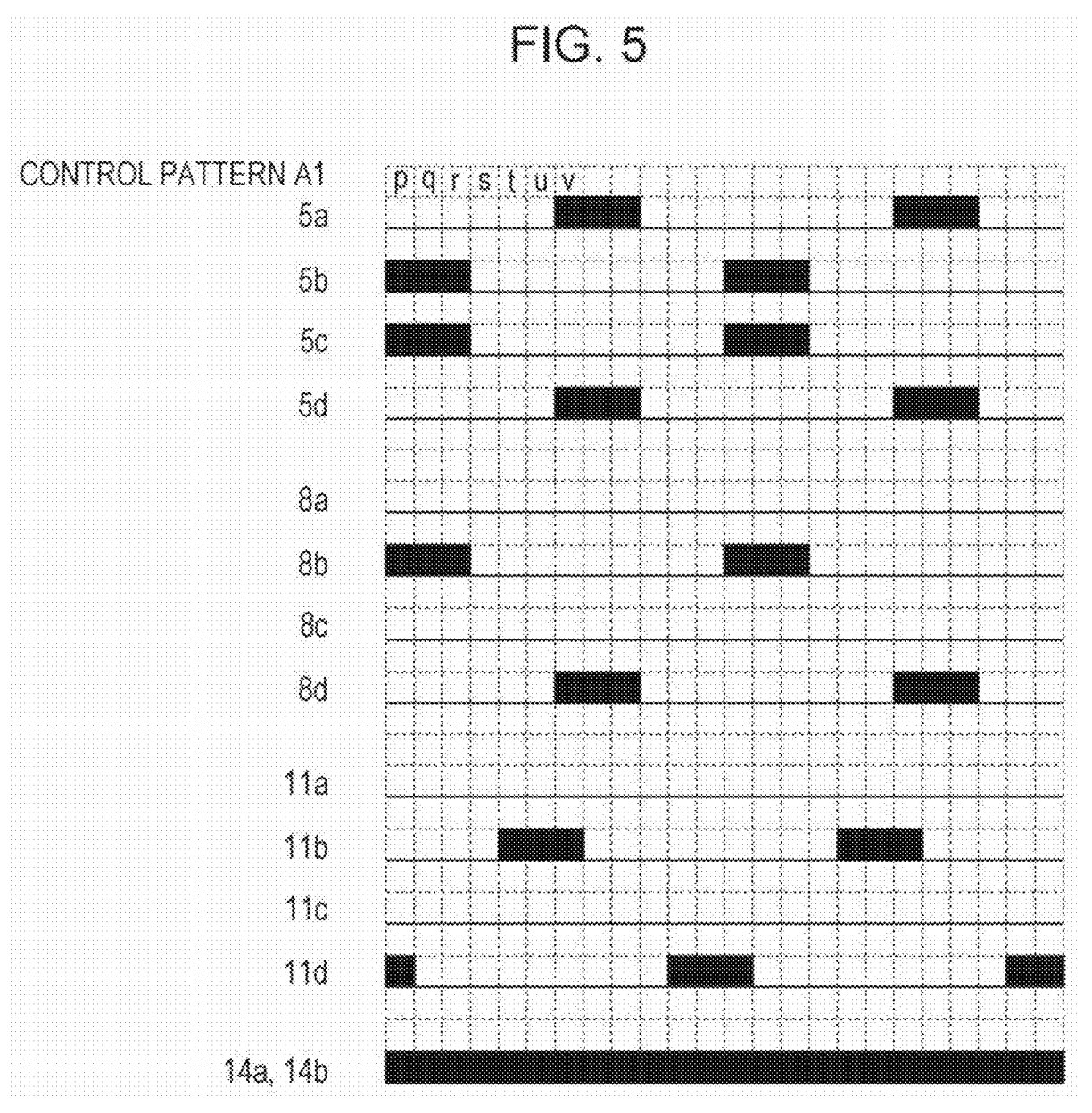

FIG. 5 is a diagram illustrating time transitions of switching control in a control pattern A1 by the control unit illustrated in FIG. 1.

FIG. 6 is a diagram illustrating a flow of current in the period p illustrated in FIG. 5.

FIG. 7 is a diagram illustrating a flow of current in the periods q and r illustrated in FIG. 5.

FIG. 8 is a diagram illustrating a flow of current in the period s illustrated in FIG. 5.

FIG. 9 is a diagram illustrating a flow of current in the periods t and u illustrated in FIG. 5.

FIG. 10 is a diagram illustrating a flow of current in the periods t and u illustrated in FIG. 5.

FIG. 11 is a diagram illustrating time transitions of switching control in a control pattern B1 by the control unit illustrated in FIG. 1.

FIG. 12 is a diagram illustrating a flow of current in the period p illustrated in FIG. 11.

FIG. 13 is a diagram illustrating a flow of current in the period q illustrated in FIG. 11.

FIG. 15 is a diagram illustrating a flow of current in the periods s, t, and u illustrated in FIG. 11.

FIG. 16 is a diagram illustrating time transitions of switching control in a control pattern C1 by the control unit illustrated in FIG. 1.

FIG. 17 is a diagram illustrating a flow of current in the periods p and q illustrated in FIG. 16.

FIG. 18 is a diagram illustrating a flow of current in the period r illustrated in FIG. 16.

FIG. 19 is a diagram illustrating a flow of current in the periods s, t, and u illustrated in FIG. 16.

FIG. 20 is a diagram illustrating a flow of current in the periods s, t, and u illustrated in FIG. 16.

FIG. 21 is a diagram illustrating time transitions of switching control in a control pattern D1 by the control unit illustrated in FIG. 1.

FIG. 22 is a diagram illustrating a flow of current in the periods p and q illustrated in FIG. 21.

FIG. 23 is a diagram illustrating a flow of current in the period r illustrated in FIG. 21.

FIG. 25 is a diagram illustrating a flow of current in the periods s and t illustrated in FIG. 21.

FIG. 26 is a diagram illustrating time transitions of switching control in a control pattern E1 by the control unit illustrated in FIG. 1.

FIG. 27 is a diagram illustrating a flow of current in the periods p and q illustrated in FIG. 26.

FIG. 28 is a diagram illustrating a flow of current in the period r illustrated in FIG. 26.

FIG. 29 is a diagram illustrating a flow of current in the periods s, t, and u illustrated in FIG. 26.

FIG. 30 is a diagram illustrating a flow of current in the periods s, t, and u illustrated in FIG. 26.

DESCRIPTION OF EMBODIMENTS

Embodiment

Configuration of Converter 100

Figure 2A:
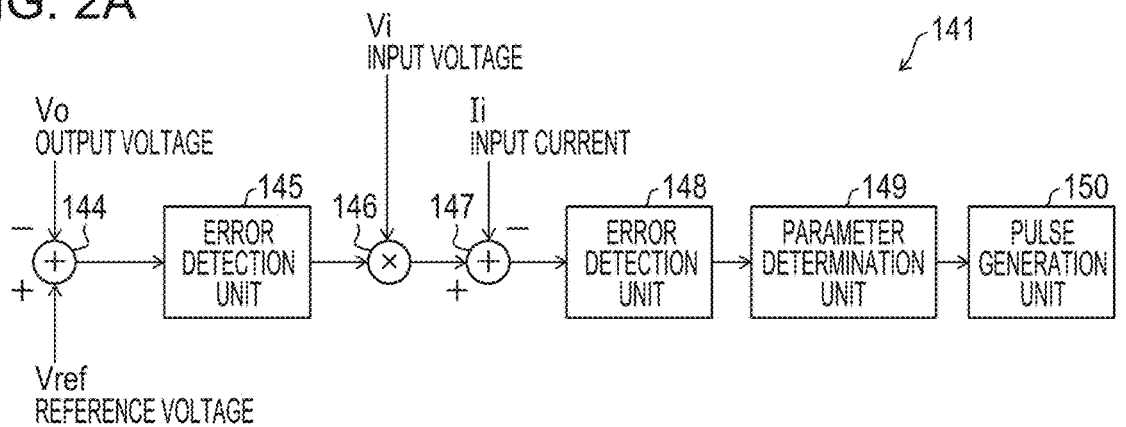
FIGS. 2A to 2C are block diagrams illustrating a configuration of the control unit illustrated in FIG. 1.

A configuration of the converter 100 will be described on the basis of FIGS. 1 and 2. FIG. 1 is a circuit diagram illustrating a configuration of the converter 100 according to Embodiment 1 of the present invention. FIGS. 2A to 2C are block diagrams illustrating a configuration of a control unit 14 illustrated in FIG. 1. As illustrated in FIG. 1, the converter 100 is provided with a transformer 1, a primary converter 101, a secondary converter 102, a tertiary converter 103, the control unit 14, and a rectifier circuit 15. The converter 100 is connected to an AC power source 16 and a load 17. The load 17 receives power output from the converter 100, and is anticipated to be an electronic circuit or the like that operates by being supplied with a constant voltage.

The converter 100 converts AC power input from the AC power source 16 into DC power, and supplies the DC power to the load 17. For this reason, power is supplied from the primary converter 101 to the secondary converter 102, but power is not supplied from the secondary converter 102 to the primary converter 101.

Therefore, bidirectional power transmission between the primary converter 101 and the secondary converter 102 is not performed. For this reason, it is not necessary to provide switching elements in all four arms of the secondary converter 102, and rectifying diodes 8a and 8c are provided instead of switching elements in two of the four arms of the secondary converter 102. Note that two rectifying diodes may be provided instead of second switching elements 8b and 8d, and two switching elements may be provided instead of the rectifying diodes 8a and 8c. Furthermore, switching elements may also be provided in all four arms of the secondary converter 102.

The transformer 1 is provided with a primary winding W1, a secondary winding W2, and a tertiary winding W3. The primary winding W1 is connected to the primary converter 101 while the secondary winding W2 is connected to the secondary converter 102 and the tertiary winding W3 is connected to the to converter 103.

The primary converter 101 is provided with an input capacitor 2, first resonance capacitors 4a to 4d, first switching elements 5a to 5d, first diodes 51a to 51d, a first coil 6, and bidirectional switches 14a and 14b. The first diodes 51a to 51d represent parasitic diodes of the first switching elements 5a to 5d herein, but represent intentionally added diodes in the case where the first switching elements 5a to 5d do not have parasitic diodes. The input capacitor 2 is connected in parallel with the first switching elements 5c and 5d and the rectifier circuit 15. The first switching elements 5a to 5d are connected in parallel with the first resonance capacitors 4a to 4d and the first diodes 51a to 51d, respectively. The first coil 6 is connected between the primary winding W1 and the bidirectional switch 14b.

The bidirectional switches 14a and 14b are connected in series. The bidirectional switch 14a is connected between the first switching elements 5c and 5d and the bidirectional switch 14b. The first switching element 5a and the first switching element 5b are connected in series, while the first switching element 5c and the first switching element 5d are connected in series. The first switching elements 5a 5b are connected in parallel with the first switching elements 5c and 5d. The bidirectional switches 14a and 14b prevent current from flowing into the primary converter 101 from the secondary converter 102 or the tertiary converter 103.

The secondary converter 102 is provided with an output capacitor 3, second resonance capacitors 9a to 9d, the rectifying diodes 8a and 8c, the second switching elements 8b and 8d, second diodes 81b and 81d, and a second coil 7. The second diodes 81b and 81d represent parasitic diodes of the second switching elements 8b and 8d herein, but represent intentionally added diodes in the case where the second switching elements 8b and 8d do not have parasitic diodes. The output capacitor 3 is connected in parallel with the rectifying diode 8a and the second switching element 8b, and is connected in parallel with the load 17.

The rectifying diodes 8a and 8c are connected in parallel with the second resonance capacitors 9a and 9c, respectively, while the second switching elements 8b and 8d are connected in parallel with the second resonance capacitors 9b and 9d and the second diodes 81b and 81d, respectively. The second coil 7 is connected between the rectifying diode 8c and the second switching element 8d, and the secondary winding W2.

The rectifying diode 8a and the second switching element 8b are connected in series, while the rectifying diode 8c and the second switching element 8d are connected in series. The rectifying diode 8a and the second switching element 8b are connected in parallel with the rectifying diode 8c and the second switching element 8d.

The tertiary converter 103 is provided with a tertiary capacitor 13 (capacitor), third resonance capacitors 12a to 12d, third switching elements 11a to 11d, third diodes 111a to 111d, and a third coil 10. The third diodes 111a to 111d represent parasitic diodes of the third switching elements 11a to 11d herein, but represent intentionally added diodes in the case where the third switching elements 11a to 11d do not have parasitic diodes. The tertiary capacitor 13 is connected in parallel with the third switching elements 11a and 11b.

The third switching elements 11a to 11d are connected in parallel with the third resonance capacitors 12a to 12d and the third diodes 111a to 111d, respectively. The third coil 10 is connected between the third switching elements 11c and 11d, and the tertiary winding W3. The third switching element 11a and the third switching element 11b are connected in series, while the third switching element 11c and the third switching element 11d are connected in series. The third switching elements 11a and 11b are connected in parallel with the third switching elements 11c and 11d.

The rectifier circuit 15 rectifies the current output from the AC power source 16. The AC power source 16 outputs AC power to the converter 100. The control unit 14 controls the switching of the first switching elements 5a to 5d, the second switching elements 8b and 8d, and the third switching elements 11a to 11d (hereinafter referred to as switching control).

Figure 2B:
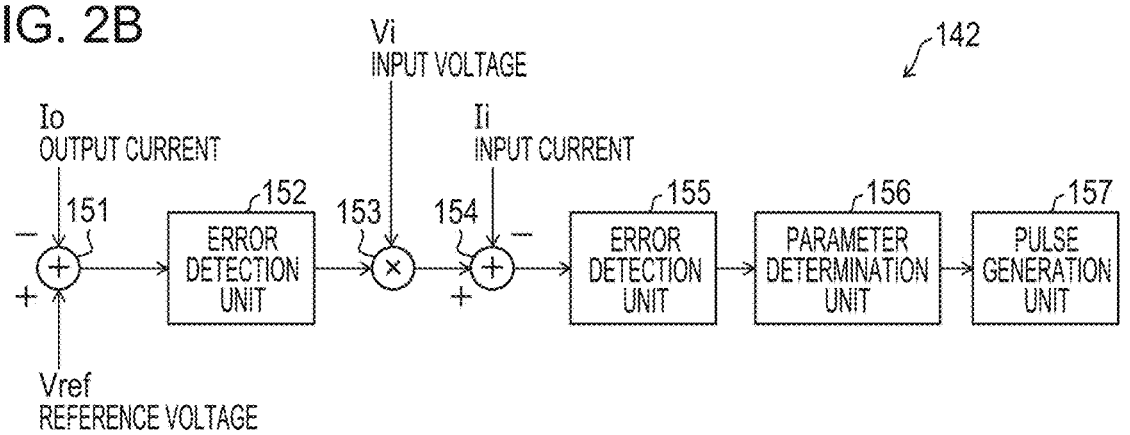
Figure 2C:
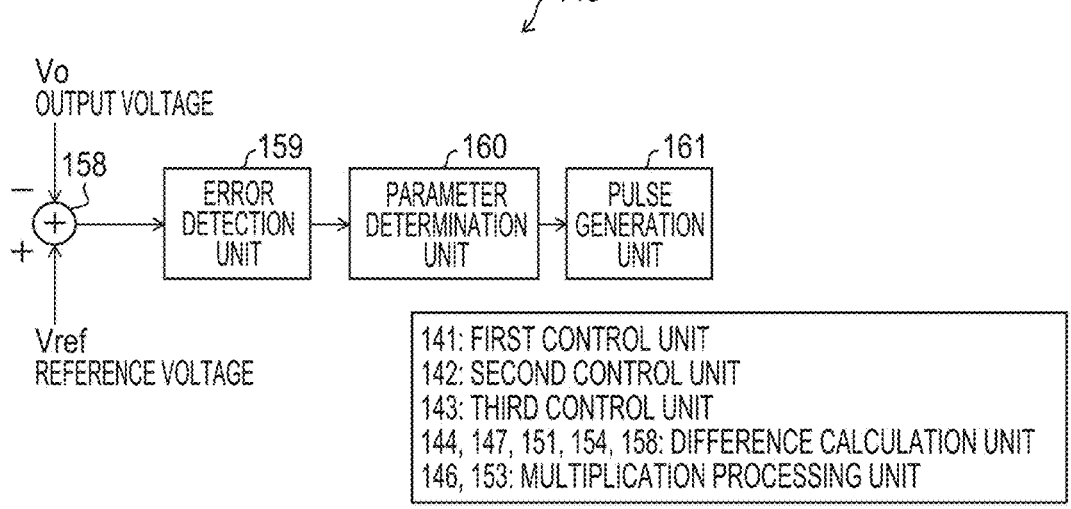

The control unit 14 is provided with a first control unit 141 illustrated in FIG. 2A, a second control unit 142 illustrated in FIG. 2B, and a third control unit 143 illustrated in FIG. 2C. The control unit 14 references an input current Ii, an input voltage Vi, an output current Io, and an output voltage Vo. The input current Ii and the input voltage Vi are, respectively, the input current and the input voltage input into the primary converter 101, while the output current Io and the output voltage Vo are, respectively, the output current and the output voltage output from the secondary converter 102 to the load 17.

The first control unit 141 is provided with the configuration illustrated in FIG. 2A to have a function of improving the power factor of the input current Ii input into the primary converter 101. As illustrated in FIG. 2A, difference calculation units 144 and 147, error detection units 145 and 148, a multiplication processing unit 146, a parameter determination unit 149, and a pulse generation unit 150 are provided. The difference calculation unit 144 calculates the difference between a preset reference voltage Vref and the output voltage Vo output to the load 17. The difference calculation unit 144 supplies the calculated difference to the error detection unit 145. The error detection unit 145 is for example an error amplifier that amplifies the difference treated as error supplied from the difference calculation unit 144, and supplies the amplified difference to the multiplication processing unit 146.

The multiplication processing unit 146 multiplies the input voltage Vi by the difference supplied from the error detection unit 145. The multiplication processing unit 146 supplies the multiplied result to the difference calculation unit 147. The difference calculation unit 147 calculates the difference between the result supplied from the multiplication processing unit 146 and the input current Ii. The difference calculation unit 147 supplies the calculated difference to the error detection unit 148.

The error detection unit 148 amplifies the difference treated as error supplied from the difference calculation unit 147, and supplies the amplified difference to the parameter determination unit 149. The parameter determination unit 149 determines a control parameter on the basis of the difference supplied from the error detection unit 148. The parameter determination unit 149 supplies the determined control parameter to the pulse generation unit 150.

The pulse generation unit 150 generates a pulse on the basis of the control parameter supplied from the parameter determination unit 149. The pulse generated by the pulse generation unit 150 is a pulse that indicates the switching timings of the first switching elements 5a to 5d, the second switching elements 8b and 8d, and the third switching elements 11a to 11d.

By performing the switching control on the basis of the pulse generated by the first control unit 141, the output voltage Vo can be set to a desired voltage and the input current Ii can be given a voltage waveform proportional to the input voltage Vi. In this way, the first control unit 141 performs the switching control to keep the power factor between the current input into the primary converter 101 and the voltage input into the primary converter 101 within a prescribed value. With this arrangement, the power factor of the input current Ii input into the primary converter 101 can be improved, and harmonic currents can be suppressed. The improvement of the power factor is intended to widen the conduction angle D correcting the current waveform having a small conduction angle characteristic of capacitor input.

As illustrated in FIG. 2B, the second control unit 142 is provided with difference calculation units 151 and 154, error detection units 152 and 155, a multiplication processing unit 153, a parameter determination unit 156, and a pulse generation unit 157. The difference calculation unit 151 calculates the difference between the preset reference voltage Vref and the output current Io output to the load 17. The difference calculation unit 151 supplies the calculated difference to the error detection unit 152.

The processes by the difference calculation unit 154, the error detection units 152 and 155, the multiplication processing unit 153, the parameter determination unit 156, and the pulse generation unit 157 are similar to the processes by the difference calculation unit 147, the error detection units 145 and 148, the multiplication processing unit 146, the parameter determination unit 149, and the pulse generation unit 150, respectively, and therefore a description is omitted.

As illustrated in FIG. 2C, the third control unit 143 is provided with a difference calculation unit 158, an error detection unit 159, a parameter determination unit 160, and a pulse generation unit 161. The processes by the difference calculation unit 158 and the error detection unit 159 are similar to the processes by the difference calculation unit 144 and the error detection unit 145, and therefore a description is omitted.

The control unit 14 performs the switching control in accordance with the pulses generated by the first control unit 141, the second control unit 142, and the third control unit 143. Also, the pulse generated by the first control unit 141 is a pulse generated such that the voltage supplied to the load 17 is constant and power is supplied from the primary converter 101 to the secondary converter 102.

The pulse generated by the second control unit 142 is a pulse generated such that the current supplied to the tertiary capacitor 13 is constant and power is supplied from the primary converter 101 to the tertiary converter 103. The pulse generated by the third control unit 143 is a pulse generated such that the voltage supplied to the load 17 is constant and power is supplied from the tertiary converter 103 to the secondary converter 102.

Consequently, the control unit 14 performs the switching control as described below. Specifically, power is supplied from the primary converter 101 to the secondary converter 102 while keeping the voltage supplied to the load 17 constant, and in addition, power is supplied from the primary converter 101 to the tertiary converter 103 while keeping the current supplied to the tertiary capacitor 13 constant.

With this arrangement, for example, consider the case where the AC power source 16 is connected to the primary converter 101, and AC power is input from the AC power source 16 to the primary converter 101. In this case, by having the control unit 14 perform the switching control, a constant voltage output can be obtained from the secondary converter 102 with an improved power factor of the input into the primary converter 101.

Also, the control unit 14 performs the switching control such that power is supplied from the tertiary converter 103 to the secondary converter 102 while keeping the voltage supplied to the load 17 constant. With this arrangement, by having the control unit 14 perform the switching control in the above case, the duration of the output from the secondary converter 102 can be lengthened sufficiently. Even if the input into the primary converter 101 is cut off, the duration of the output from the secondary converter 102 can be secured.

Furthermore, the control unit 14 performs the switching control such that power is supplied from the tertiary converter 103 to the secondary converter 102 in the state where power is not input into the primary converter 101. With this arrangement, a lowering of the voltage of the secondary converter 102 due to a lack of power being input into the primary converter 101 can be delayed. Therefore, the duration of the output from the secondary converter 102 can be lengthened sufficiently. Also, even if the input into the primary converter 101 is cut off, the duration of the power output from the secondary converter 102 can be secured.

Switching Control by Control Unit 14

Figure 3A:
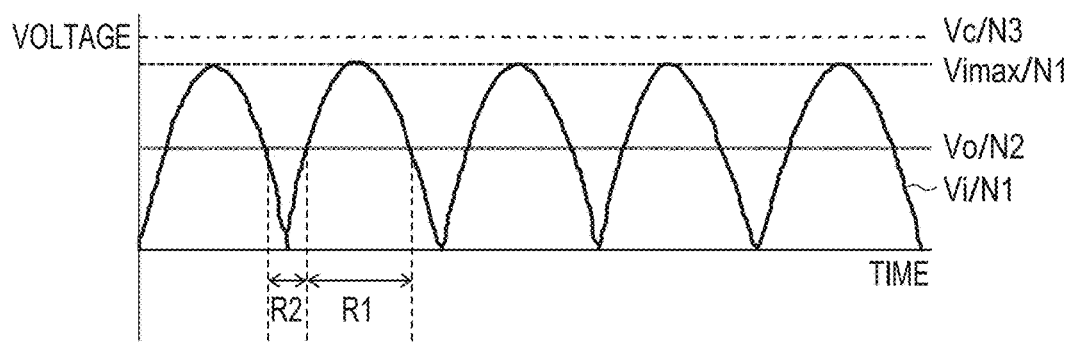
FIGS. 3A to 3C are graphs illustrating voltage waveforms in an input capacitor of the converter illustrated in FIG. 1.
Figure 3B:
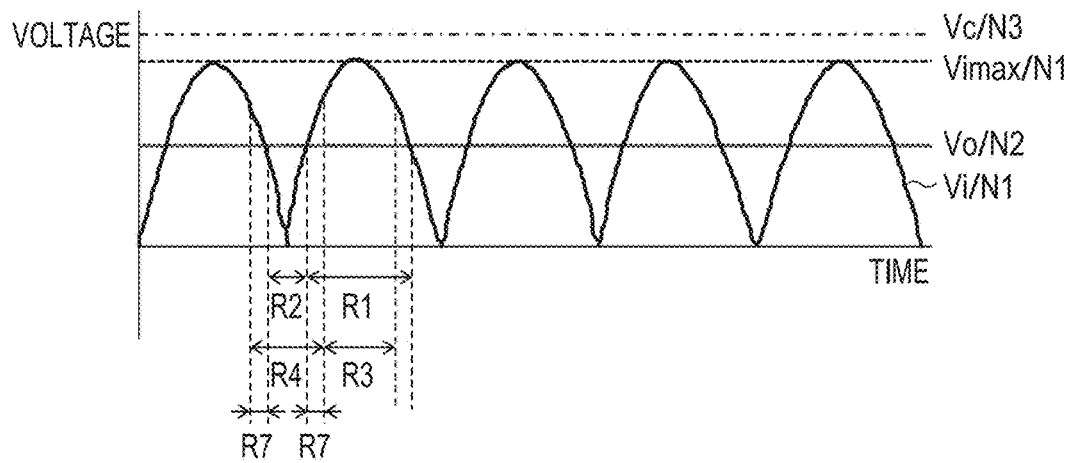
Figure 3C:
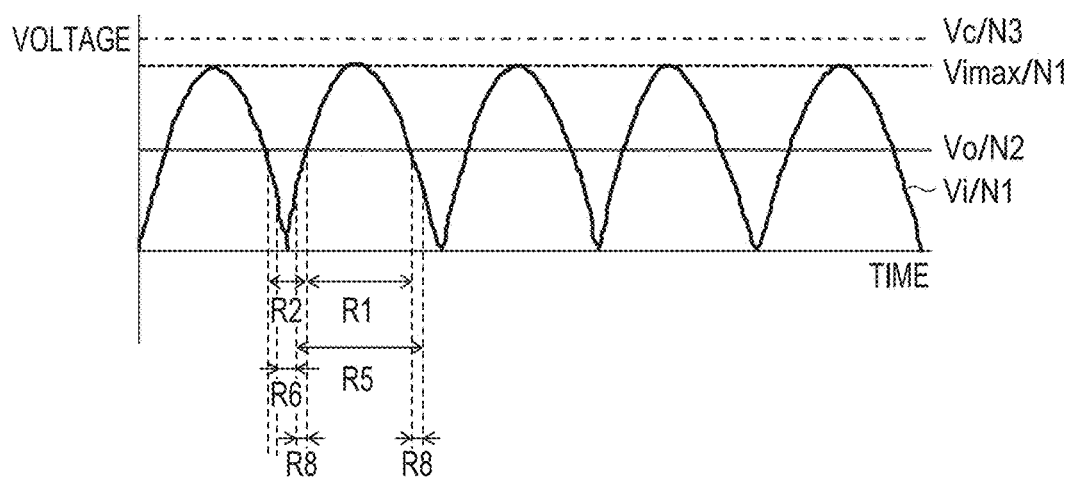

FIGS. 3A to 3C are graphs illustrating voltage waveforms in the input capacitor 2 of the converter 100 illustrated in FIG. 1. The waveforms of the input voltage Vi that is full-wave rectified by the rectifier circuit 15 become like the waveforms illustrated in FIG. 3A to 3C.

FIG. 4A is a table illustrating modes of the switching control by the control unit 14 in the case where power is supplied from the primary converter 101 to the secondary converter 102 and power is supplied from the primary converter 101 to the tertiary converter 103. FIG. 4B is a table illustrating modes of the switching control by the control unit 14 in the case where power is supplied from the primary converter 101 to the secondary converter 102 and power is supplied from the tertiary converter 103 to the secondary converter 102.

The turns ratio of the transformer 1 is assumed to be (number of turns in primary winding W1):(number of turns in secondary winding W2):(number of turns in tertiary winding W3)=N1:N2:N3. Also, let Vimax be the maximum value of the input voltage Vi, let Vo be the output voltage that is output from the secondary converter 102 to the load 17, and let Vc be the output voltage that is output from the tertiary converter 103 to the tertiary capacitor 13. In this case, by setting the turns ratio of the transformer 1 such that Vimax/N1>Vo/N2>0 and Vc/N3>Vimax/N1, the numbers of turns N1, N2, and N3 are determined.

Additionally, consider the case where the switching control is performed by the control unit 14 such that power is supplied from the primary converter 101 or the tertiary converter 103 to the secondary converter 102 while keeping the voltage supplied to the load 17 constant. In this case, the numbers of turns N1, N2, and N3 may be determined such that the voltage input into the secondary converter 102 is not more than a maximum value of the voltage tolerance of the load 17. With this arrangement, in the case where power is supplied to the secondary converter 102 while keeping the voltage supplied to the load 17 constant, the primary converter 101, the secondary converter 102, and the tertiary converter 103 can be controlled independently from each other.

Furthermore, consider the case where the switching control is performed by the control unit 14 such that power is supplied from the primary converter 101 to the tertiary converter 103 while keeping the current supplied to the tertiary capacitor 13 constant. In this case, the numbers of turns N1 and N3 may be determined such that the voltage input into the tertiary converter 103 is lower than a minimum value of the voltage range in which current flows to the tertiary capacitor 13. With this arrangement, in the case where power is supplied to the tertiary converter 103 while keeping the current supplied to the tertiary capacitor 13 constant, the primary converter 101, the secondary converter 102, and the tertiary converter 103 can be controlled independently from each other.

In FIGS. 3A to 3C, consider the case where Vi/N1≥Vo/N2, power is supplied from the primary converter 101 to the secondary converter 102, and power is supplied from the primary converter 101 to the tertiary converter 103 (hereinafter referred to as the first case). In this case, the control unit 14 performs the switching control according to a control pattern A1 or a control pattern B1 illustrated in FIG. 4A. The control patterns illustrated in FIGS. 4A and 4B will be described later. In the first case, the current supplied to the load 17 takes a current value in accordance with the input voltage Vi considering the power factor of the input current Ii.

Consider the case where Vi/N1≥Vo/N2, power is supplied from the primary converter 101 to the secondary converter 102, and power is supplied from the tertiary converter 103 to the secondary converter 102 (hereinafter referred to as the second case). In this case, the control unit 14 performs the switching control according to one of the control patterns C1, D1, E1, and F1 illustrated in FIG. 4B. The control pattern F1 will be described later.

Consider the case where Vi/N1<Vo/N2, power is supplied from the primary converter 101 to the secondary converter 102, and power is supplied from the primary converter 101 to the tertiary converter 103 (hereinafter referred to as the third case). In this case, the control unit 14 performs the switching control according to the control pattern B1 illustrated in FIG. 4A. In the third case, the current supplied to the load 17 takes a current value in accordance with the input voltage Vi considering the power factor of the input current Ii.

Consider the case where Vi/N1<Vo/N2, power is supplied from the primary converter 101 to the secondary converter 102, and power is supplied from the tertiary converter 103 to the secondary converter 102 (hereinafter referred to as the fourth case). In this case, the control unit 14 performs the switching control according to one of the control patterns D1, E1, and F1 illustrated in FIG. 4B.

In the second and fourth cases, the excitation period is divided into a first period and a second period. In the first period, excitation from the primary converter 101 to the secondary converter 102 is performed, while in the second period after the first period, excitation from the tertiary converter 103 to the secondary converter 102 is performed. When excitation from the tertiary converter 103 to the secondary converter 102 is performed, the bidirectional switches 14a and 14b are turned off. Note that excitation from the tertiary converter 103 to the secondary converter 102 may be performed in the first period, and excitation from the primary converter 101 to the secondary converter 102 may be performed in the second period.

In FIGS. 3A to 3C, a period R1 is the period in which Vi/N1≥Vo/N2, while a period R2 is the period in which Vi/N1<Vo/N2. FIGS. 3A to 30 are graphs illustrating cases of the switching control by the control unit 14 that are different from each other. In the case of FIG. 3A, the period R1 coincides with the periods during which power is supplied from the primary converter 101 to the secondary converter 102 and power is supplied from the primary converter 101 to the tertiary converter 103. With this arrangement, because the period R1 corresponds to the first case, the control unit 14 performs the switching control according to the control pattern A1 or the control pattern B1 in the period R1.

Also, in the case of FIG. 3A, the period R2 coincides with the periods during which power is supplied from the primary converter 101 to the secondary converter 102 and power is supplied from the tertiary converter 103 to the secondary converter 102. With this arrangement, because the period R2 corresponds to the fourth case, the control unit 14 performs the switching control according to the control pattern D1 or the control pattern E1 in the period R2.

In the case of FIG. 3B, a period R3 is the period during which power is supplied from the primary converter 101 to the secondary converter 102 and power is supplied from the primary converter 101 to the tertiary converter 103. The period R3 is a period included in the period R1. With this arrangement, because the period R3 corresponds to the first case, the control unit 14 performs the switching control according to the control pattern A1 or the control pattern B1 in the period R3.

Also, in the case of FIG. 3B, a period R4 is the period during which power is supplied from the primary converter 101 to the secondary converter 102 and power is supplied from the tertiary converter 103 to the secondary converter 102. The periods R2 and R7 are periods included in the period R4. The period R7 is a period included in the period R1. With this arrangement, the period R2 corresponds to the fourth case, and the period R7 corresponds to the second case. For this reason, the control unit 14 appropriately selects and performs the switching control according to one of the control patterns D1, E1, and F1 applicable to the second case and the fourth case in the period R4 that includes the periods R2 and R7. In other words, different control patterns may be selected for each of the periods R2 and R7 in the period R4.

In the case of FIG. 3C, a period R5 is the period during which power is supplied from the primary converter 101 to the secondary converter 102 and power is supplied from the primary converter 101 to the tertiary converter 103. The periods R1 and R8 are periods included in the period R5. The period R8 is a period included in the period R2. With this arrangement, the period R1 corresponds to the first case, and the period R8 corresponds to the third case. For this reason, the control unit 14 performs the switching control according to the control pattern A1 or the control pattern B1 applicable to the first case in the period R1 included in the period R5, and performs the switching control according to the control pattern B1 applicable to the third case in the period R8 included in the period R5.

Also, in the case of FIG. 3C, a period R6 is the period during which power is supplied from the primary converter 101 to the secondary converter 102 and power is supplied from the tertiary converter 103 to the secondary converter 102. The period R6 is a period included in the period R2. With this arrangement, because the period R6 corresponds to the fourth case, the control unit 14 per the switching control according to one of the control patterns D1, E1, and F1 in the period R6.

As above, the control unit 14 performs the switching control such that power is supplied from the primary converter 101 to the tertiary converter 103 in the case where the voltage input into the primary converter 101 is a predetermined threshold value or higher, and such that power is supplied from the tertiary converter 103 to the secondary converter 102 in the case where the voltage input into the primary converter 101 is lower than the predetermined threshold value. With this arrangement, variations dependent on the periodicity of the input voltage Vi in the power output from the secondary converter 102 to the load 17 can be reduced. The predetermined threshold value is Vo/N2 in the case of FIG. 3A, a value larger than Vo/N2 in the case of FIG. 3B, and a value smaller than Vo/N2 in the case of FIG. 3C.

On the other hand, consider the case where the tertiary converter is not connected to the primary converter and the secondary converter, and power is supplied from the primary converter to the secondary converter. In this case, the supply of a constant voltage output from the secondary converter to the load and an improvement in the power factor of the input into the primary converter are achieved, but a reduction in ripple voltage supplied from the secondary converter to the load is not achieved.

Accordingly, by storing power from the primary converter 101 in the tertiary capacitor 13 at appropriate timings and supplying power from the tertiary converter 103 to the secondary converter 102 like in the converter 100 according to one aspect of the present invention, a reduction in the ripple voltage whose variation depends on the periodicity of the input voltage Vi is also achieved.

Control Patterns of Switching Control by Control Unit 14

Next, the control patterns illustrated in FIGS. 4A and 4B will be described below. Herein, "primary→secondary" denotes the case where power is supplied from the primary converter 101 to the secondary converter 102, while "primary→tertiary" denotes the case where power is supplied from the primary converter 101 to the tertiary converter 103.

Also, "tertiary→secondary" denotes the case where power is supplied from the tertiary converter 103 to the secondary converter 102. Herein, the case of "primary→tertiary" is never a Mode 1. This is because, given that Vc/N3>Vimax/N1, in Mode 1 which has no voltage-raising effect, power cannot be supplied from the primary converter 101 to the tertiary converter 103.

The control pattern A1 is a control pattern in which the switching control is performed in Mode 1 for the "primary→secondary" case and in Mode 2 for the "primary→tertiary" case. The control pattern B1 is a control pattern in which the switching control is performed in Mode 2 for the "primary→secondary" case and in Mode 2 for the "primary→tertiary" case. The control pattern C1 is a control pattern in which the switching control is performed in Mode 1 for the "primary→secondary" case and in Mode 1 for the "tertiary→secondary" case. The control pattern D1 is a control pattern in which the switching control is performed in Mode 2 for the "primary→secondary" case and in Mode 1 for the "tertiary→secondary" case. The control pattern E1 is a control pattern in which the switching control is performed in Mode 2 for the "primary→secondary" case and in Mode 2 for the "tertiary→secondary" case. The control pattern F1 is a control pattern in which the switching control is performed in Mode 1 for the "primary→secondary" case and in Mode 2 for the "tertiary→secondary" case. The control pattern F1 is the opposite of the process for the "primary→secondary" case and the process for the "tertiary→secondary" case in the control pattern D1, and therefore a description is omitted from the following.

Herein, in each converter, the upper arm that is close to the output is referred to as the first arm, while the lower arm that is close to the output is referred to as the second arm, the upper arm that is close to the input is referred to as the third arm, and the lower arm that is close to the input is referred to as the fourth arm. For example, in the primary converter 101, the first switching elements 5a, 5b, 5c, and 5d are positioned in the first arm, second arm, third arm, and fourth arm, respectively.

Mode 1

In Mode 1, in an input-side converter, the switching element positioned in the second arm and the switching element positioned in the third arm are turned on at the same time. Also, in the input-side converter, the switching element positioned in the first arm and the switching element positioned in the fourth arm are turned on at the same time.

In the input-side converter, the switching elements positioned in the second arm and the third arm are switched with the phase offset 180 degrees from the switching elements positioned in the first arm and the fourth arm. Also, in an output-side converter, the switching element positioned in the second arm is switched with the phase offset 180 degrees from the switching element positioned in the fourth arm.

The second arm in the input-side converter and the second arm in the output-side converter are switched in phase with each other. Also, except for dead time, the on-duty of each switching element that is switched is varied from 0% to 50% depending on the magnitude of the output power to adjust the output power. The above description is treated as the basis of Mode 1.

Herein, Mode 1 will be described for a case in which there are two input-side converters and one output-side converter. In this case, in Mode 1, the switching elements of two arms in one of the input-side converters are not turned on at the same time as the corresponding switching elements in two arms of the other input-side converter.

After the on-period ends for the switching elements of the two arms in one of the input-side converters, the corresponding switching elements in two arms of the other input-side converter are immediately turned on at the same time. The combined on-period of the two switching elements in both of the input-side converters is treated as the entire on-period of the switching elements in the input-side converters.

Specifically, Mode 1 will be described for the case of treating the primary converter 101 and the tertiary converter 103 as the input-side converters, and treating the secondary converter 102 as the output-side converter. In this case, in Mode 1, in the primary converter 101, the switching element positioned in the second arm and the switching element positioned in the third arm are turned on at the same time, and the switching element positioned in the first arm and the switching element positioned in the fourth arm are turned on at the same time.

In the primary converter 101, the switching elements positioned in the second arm and the third arm are switched with the phase offset 180 degrees from the switching elements positioned in the first arm and the fourth arm. Also, in the tertiary converter 103, the switching element positioned in the second arm is turned on immediately after the on-period ends for the switching element positioned in the second arm of the primary converter 101. In the tertiary converter 103, the switching element positioned in the third arm is turned on immediately after the on-period ends for the switching element positioned in the third arm of the primary converter 101.

In the same way, given the symmetry of the circuits, similar operations are performed between the switching elements positioned in the first arm and the fourth arm of the primary converter 101, and the switching elements positioned in the first arm and the fourth arm of the tertiary converter 103. Consequently, in the tertiary converter 103, the second arm and the third arm are switched with the phase offset 180 degrees from the first arm and the fourth arm.

Also, in the secondary converter 102 acting as the output-side converter, the switching element positioned in the second arm is switched with the phase offset 180 degrees from the switching element positioned in the fourth arm. In-phase switching is performed between the entire on-period of the switching elements positioned in the corresponding arms of the primary converter 101 and the tertiary converter 103 acting as the input-side converters and the on-period of the switching elements positioned in the corresponding arms of the secondary converter 102 acting as the output-side converter.

Also, except for dead time, the on-duty of each switching element that is switched is varied from 0% to 50% depending on the magnitude of the output power to adjust the output power. This on-duty is the on-duty for the entire on-period of the switching elements of the primary converter 101 and the tertiary converter 103 acting as the input-side converters.

Mode 2

In Mode 2, in the input-side converter, the switching element positioned in the second arm and the switching element positioned in the third arm are turned on at the same time. Also, in the input-side converter, the switching element positioned in the first arm and the switching element positioned in the fourth arm are turned on at the same time.

In the input-side converter, the switching elements positioned in the second arm and the third arm are switched with the phase offset 180 degrees from the switching elements positioned in the first arm and the fourth arm. Also, in the output-side converter, the switching element positioned in the second arm is switched with the phase offset 180 degrees from the switching element positioned in the fourth arm. Also, the phases of the second arm of the input-side converter and the second arm of the output-side converter are shifted according to the output power, and the amount of the phase shift is varied from 0 degrees to 90 degrees depending on the magnitude of the output power to adjust the output power. The above description is treated as the basis of Mode 2.

Herein, Mode 2 will be described for a case in which there are two input-side converters and one output-side converter. In this case, in Mode 2, the switching elements of two arms in one of the input-side converters are not turned on at the same time as the corresponding switching elements in two arms of the other input-side converter.

After the on-period ends for the switching elements of the two arms in one of the input-side converters, the corresponding switching elements in two arms of the other input-side converter are immediately turned on at the same time. The combined on-period of the two switching elements in both of the input-side converters is treated as the entire on-period of the switching elements in the input-side converters.

Specifically, Mode 2 will be described for the case of treating the primary converter 101 and the tertiary converter 103 as the input-side converters, and treating the secondary converter 102 as the output-side converter. In this case, in Mode 2, in the primary converter 101, the switching element positioned in the second arm and the switching element positioned in the third arm are turned on at the same time, and the switching element positioned in the first arm and the switching element positioned in the fourth arm are turned on at the same time.

In the primary converter 101, the switching elements positioned in the second arm and the third arm are switched with the phase offset 180 degrees from the switching elements positioned in the first arm and the fourth arm. Also, in the tertiary converter 103, the switching element positioned in the second arm is turned on immediately after the on-period ends for the switching element positioned in the second arm of the primary converter 101. In the tertiary converter 103, the switching element positioned in the third arm is turned on immediately after the on-period ends for the switching element positioned in the third arm of the primary converter 101.

In the same way, given the symmetry of the circuits, similar operations are performed between the switching elements positioned in the first arm and the fourth arm of the primary converter 101, and the switching elements positioned in the first arm and the fourth arm of the tertiary converter 103. Consequently, in the tertiary converter 103, the second arm and the third arm are switched with the phase offset 180 degrees from the first arm and the fourth arm.

Also, in the secondary converter 102 acting as the output-side converter, the switching element positioned in the second arm is switched with the phase offset 180 degrees from the switching element positioned in the fourth arm. The phase difference between the entire on-period of the switching elements positioned in the corresponding arms of the primary converter 101 and the tertiary converter 103 acting as the input-side converters and the on-period of the switching elements positioned in the corresponding arms of the secondary converter 102 acting as the output-side converter is varied from 0 degrees to 90 degrees depending on the magnitude of the output power to adjust the output power.

Note that in the above descriptions of Mode 1 and Mode 2 for two input-side converters and one output-side converter, the input-side converters, namely the primary converter 101 and the tertiary converter 103, are described as turning on corresponding switching elements consecutively in the above order. However, regarding this case, the switching elements in the tertiary converter 103 may be turned on first, and then immediately after the on-period of the switching elements ends, the corresponding switching elements in the primary converter 101 may be turned on.

Also, the control unit 14 may perform the switching control in Mode 1 in the case where the output current Io output from the secondary converter 102 to the load 17 is less than a predetermined specific value, and performs the switching control in Mode 2 in the case where the output current Io is equal to or greater than the predetermined specific value. In other words, the control unit 14 performs the switching control such that the switching timings in the case where the output current Io is equal to or greater than the predetermined specific value are different from the switching timings in the case where the output current Io is less than the predetermined specific value. Here, for example, consider the case where, if the output current Io is equal to or greater than the predetermined specific value, the switching control is performed in Mode 2 which has a voltage-raising effect, whereas if the output current Io is less than the predetermined specific value, the switching control is performed in Mode 1 which does not have a voltage-raising effect. In this case, the value of the output current Io output to the load 17 can be adjusted over a wide range.

Furthermore, the control unit 14 performs the switching control to switch seamlessly between Mode 1 and Mode 2. That is, the control unit 14 performs the switching control to switch seamlessly between the switching process in the case where the output current Io is equal to or greater than the predetermined specific value and the switching process in the case where the output current Io is less than the predetermined specific value. In other words, the control unit 14 switches continuously between Mode 1 and Mode 2. With this arrangement, when switching between Mode 1 and Mode 2, variations in the discontinuous output voltage caused by changes in the operating mode at the interface of the operating mode switch can be suppressed.

Flow of Processes According to Switching Control by Control Unit 14

Next, the flow of processes according to the switching control by the control unit 14 will be described on the basis of FIGS. 5 to 30. FIG. 5 is a diagram illustrating time transitions of switching control in the control pattern A1. The portions shaded black in FIG. 5 indicate that the element is on, while p, q, r, s, t, u, and v denote periods. In FIG. 5, time proceeds to the right. For example, the diagram indicates that in the period p, the first switching elements 5b and 5c, the second switching element 8b, the third switching element 11d, and the bidirectional switches 14a and 14b are on. The same applies to FIGS. 11, 16, 21, and 26.

Flow of Processes in Control Pattern A1

FIG. 6 is a diagram illustrating the flow of current in the period p illustrated in FIG. 5. In the period p, the first switching elements 5b and 5c, the second switching element 8b, the third switching element 11d, and the bidirectional switches 14a and 14b are on. For this reason, as illustrated in FIG. 6, in the primary converter 101, current flows in the order of the input capacitor 2, the first switching element 5c, the bidirectional switches 14a and 14b, the first coil 6, the transformer 1, and the first switching element 5b. Consequently, excitation energy is stored in the first coil 6.

Also, in the secondary converter 102, current flows in the order of the output capacitor 3, the second switching element 8b, the transformer 1, the second coil 7, and the rectifying diode 8c. Consequently, excitation energy is stored in the second coil 7. In the tertiary converter 103, current flows in the order of the third diode 111b, the transformer 1, the third coil 10, and the third switching element 11d. Consequently, excitation energy is stored in the third coil 10.

FIG. 7 is a diagram illustrating the flow of current in the periods q and r illustrated in FIG. 5. In the periods q and r, the first switching elements 5b and 5c, the second switching element 8b, and the bidirectional switches 14a and 14b are on. For this reason, as illustrated in FIG. 7, the flow of current in the primary converter 101 is the same as the flow of current in the primary converter 101 illustrated in FIG. 6. Consequently, excitation energy is stored in the first coil 6.

Also, the flow of current in the secondary converter 102 is the same as the flow of current in the secondary converter 102 illustrated in FIG. 6. Consequently, excitation energy is stored in the second coil 7. In the tertiary converter 103, current flows in the order of the tertiary capacitor 13, the third diode 111b, the transformer 1, the third coil 10, and the third switching element 11c. Consequently, the third coil 10 commutates in the tertiary converter 103.

FIG. 8 is a diagram illustrating the flow of current in the period s illustrated in FIG. 5. In the period s, the bidirectional switches 14a and 14b are on. For this reason, as illustrated in FIG. 8, in the primary converter 101, current flows in the order of the input capacitor 2, the first diode 51d, the bidirectional switches 14a and 14b, the first coil 6, the transformer 1, and the first diode 51a. Consequently, the excitation energy stored in the first coil 6 is regenerated.

Also, the flow of current in the secondary converter 102 is the same as the flow of current in the secondary converter 102 illustrated in FIG. 7, except that the current flows to the second diode 81b rather than the second switching element 8b. Consequently, the current continues to flow to the output side including the output capacitor 3 due to the excitation energy stored in the second coil 7. The flow of current in the tertiary converter 103 is the same as the flow of current in the tertiary converter 103 illustrated in FIG. 7. Consequently, the commutation operation by the third coil 10 continues.

FIGS. 9 and 10 are diagram illustrating the flow of current in the periods t and u illustrated in FIG. 5. In the periods t and u, the third switching element 11b and the bidirectional switches 14a and 14b are on, but the turning on of the third switching element 11b does not affect the path of the current. After the excitation energy stored in the first coil 6, the second coil 7, and the third coil 10 is discharged, electrical oscillations are repeated, alternating between the flow of current illustrated in FIG. 9 and the flow of current illustrated in FIG. 10.

In FIG. 9, the flow of current in the primary converter 101 is the same as the flow of current in the primary converter 101 illustrated in FIG. 8. The flow of current in the secondary converter 102 is the same as the flow of current in the secondary converter 102 illustrated in FIG. 6, except that the current flows to the second diode 81b rather than the second switching element 8b. The flow of current in the tertiary converter 103 is the same as the flow of current in the tertiary converter 103 illustrated in FIG. 7.

In FIG. 10, the flow of current in the primary converter 101 is the reverse of the flow of current in the primary converter 101 illustrated in FIG. 6. In the secondary converter 102, current flows in the order of the output capacitor 3, the second diode 81d, the second coil 7, the transformer 1, and the rectifying diode 8a.

Considering the symmetry of the circuits in the converter 100, the switching timings in the period v of the control pattern A1 are symmetrical with the switching timings in the period p of the control pattern A1, and therefore a description is omitted.

Flow of Processes in Control Pattern B1

FIG. 11 is a diagram illustrating time transitions of switching control in the control pattern B1. FIG. 12 is a diagram illustrating the flow of current in the period p illustrated in FIG. 11. In the period p, the first switching elements 5b and 5c, the second switching element 8d, the third switching element 11d, and the bidirectional switches 14a and 14b are on. For this reason, as illustrated in FIG. 12, the flow of current in the primary converter 101 is the same as the flow of current in the primary converter 101 illustrated in FIG. 6. Consequently, excitation energy is stored in the first coil 6.

Also, in the secondary converter 102, current flows in the order of the second diode 81b, the transformer 1, the second coil 7, and the second switching element 8d. Consequently, excitation energy is stored in the second coil 7. The flow of current in the tertiary converter 103 is the same as the flow of current in the tertiary converter 103 illustrated in FIG. 6. Consequently, excitation energy is stored in the third coil 10.

FIG. 13 is a diagram illustrating the flow of current in the period q illustrated in FIG. 11. In the period q, the first switching elements 5b and 5c, the second switching element 8d, and the bidirectional switches 14a and 14b are on. For this reason, as illustrated in FIG. 13, the flow of current in the primary converter 101 is the same as the flow of current in the primary converter 101 illustrated in FIG. 7. Consequently, excitation energy is stored in the first coil 6.

Also, the flow of current in the secondary converter 102 is the same as the flow of current in the secondary converter 102 illustrated in FIG. 12. Consequently, excitation energy is stored in the second coil 7. The flow of current in the tertiary converter 103 is the same as the flow of current in the tertiary converter 103 illustrated in FIG. 7. Consequently, the third coil 10 commutates in the tertiary converter 103.

Figure 14:
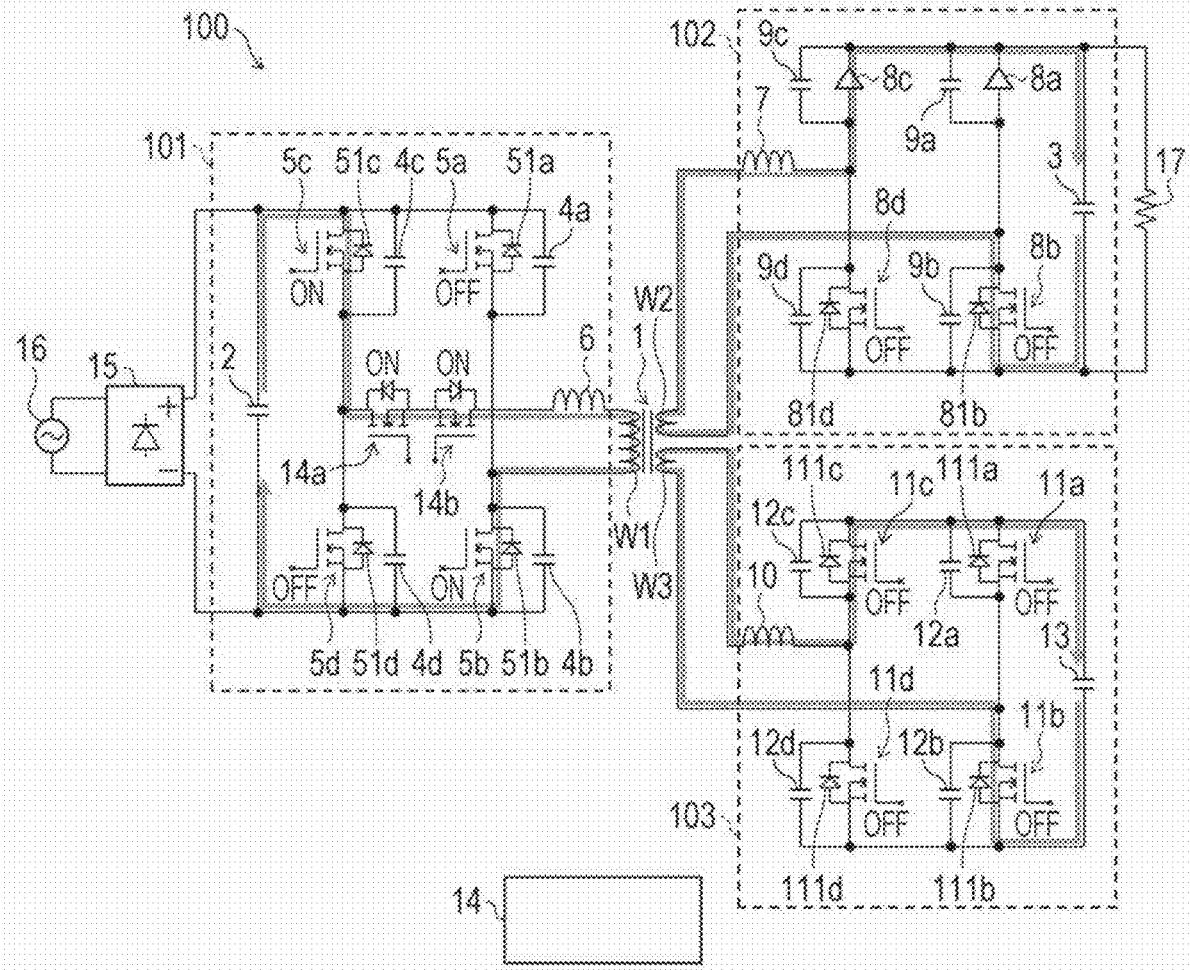
FIG. 14 is a diagram illustrating a flow of current in the period r illustrated in FIG. 11.

FIG. 14 is a diagram illustrating the flow of current in the period r illustrated in FIG. 11. In the period r, the first switching elements 5b and 5c and the bidirectional switches 14a and 14b are on. For this reason, as illustrated in FIG. 14, the flow of current in the primary converter 101 is the same as the flow of current in the primary converter 101 illustrated in FIG. 6. Consequently, excitation energy is stored in the first coil 6.

Also, the flow of current in the secondary converter 102 is the same as the flow of current in the secondary converter 102 illustrated in FIG. 6, except that the current flows to the second diode 81b rather than the second switching element 8b. Consequently, the second coil 7 commutates. The flow of current in the tertiary converter 103 is the same as the flow of current in the tertiary converter 103 illustrated in FIG. 7. Consequently, the commutation operation by the third coil 10 continues.

FIG. 15 is a diagram illustrating the flow of current in the period s, t, and u illustrated in FIG. 11. In the period s, only the bidirectional switches 14a and 14b are on. For this reason, the flow of current in the primary converter 101 is the same as the flow of current in the primary converter 101 illustrated in FIG. 8. Consequently, the excitation energy stored in the first coil 6 is regenerated.

The flow of current in the secondary converter 102 is the same as the flow of current in the secondary converter 102 illustrated in FIG. 6, except that the current flows to the second diode 81b rather than the second switching element 8b. Consequently, the commutation operation by the second coil 7 continues. The flow of current in the tertiary converter 103 is the same as the flow of current in the tertiary converter 103 illustrated in FIG. 7. Consequently, the commutation operation by the third coil 10 continues.

In the period t, the third switching element 11b and the bidirectional switches 14a and 14b are on, but the turning on of the third switching element 11b does not affect the path of the current. Therefore, in the period t, a state similar to the period s is maintained. Also, in the period u, the second switching element 8b, the third switching element 11b, and the bidirectional switches 14a and 14b are on, but the turning on of the second switching element 8b does not affect the path of the current. Therefore, in the period u, a state similar to the period t is maintained. When the excitation energy stored in the first coil 6, the second coil 7, and the third coil 10 becomes zero, the current repeats electrical oscillations like the periods t and u or the control pattern A1.

Considering the symmetry of the circuits in the converter 100, the switching timings in the period v of the control pattern B1 are symmetrical with the switching timings in the period p of the control pattern B1, and therefore a description is omitted.

Flow of Processes in Control Pattern C1

Figure 16:
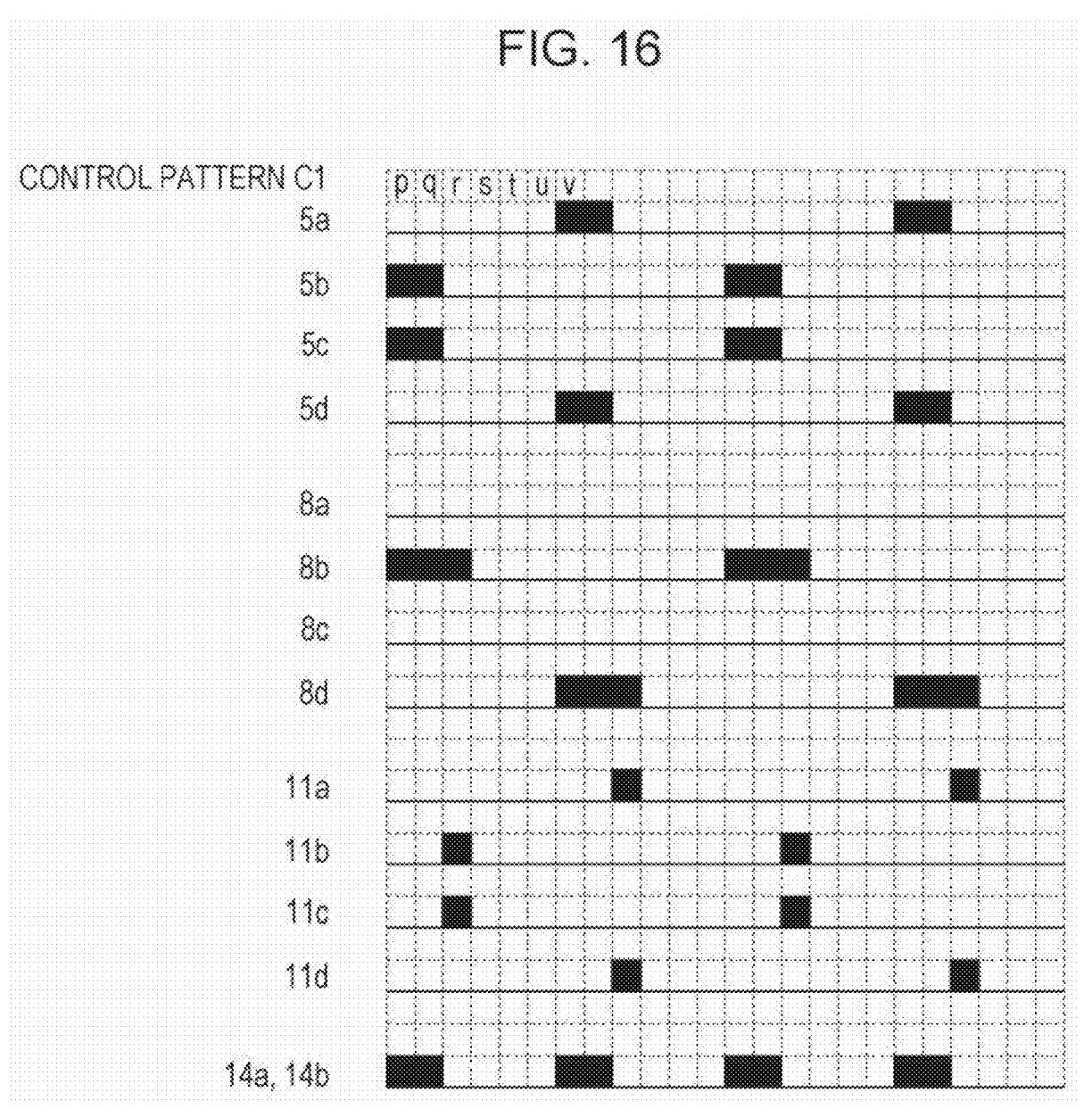

FIG. 16 is a diagram illustrating time transitions of switching control in the control pattern C1. In the control pattern C1, in Mode 1, the third switching elements 11b and 11c of the tertiary converter 103 are turned on following a period in which the first switching elements 5b and 5c or the primary converter 101 are turned on. Also, in Mode 1, the third switching element 11a and 11d of the tertiary converter 103 are turned on following a period in which the first switching elements 5a and 5d of the primary converter 101 are turned on.

In other words, the first switching elements of the primary converter 101 and the third switching elements of the tertiary converter 103 are not turned on at the same time. This is to prevent the transfer of power from the tertiary converter 103 to the primary converter 101. The first switching elements of the primary converter 101 may also be turned on following the period in which the third switching elements of the tertiary converter 103 are turned on.

Consider a period in which two switching elements of an input-side converter are turned on at the same time while a switching element of a turned-on output-side converter is turned off. In Mode 1, it is sufficient to turn on the switching elements of the other input-side converter in this period. For example, in the period during which the second switching element 8b is off, it is sufficient to turn on the first switching elements 5a and 3d and the third switching elements 11a and 11d.

FIG. 17 is a diagram illustrating the flow of current in the periods p and q illustrated in FIG. 16. In the periods p and q, the first switching elements 5b and 5c, the second switching element 8b, and the bidirectional switches 14a and 14b are on. For this reason, as illustrated in FIG. 17, the flow of current in the primary converter 101 is the same as the flow of current in the primary converter 101 illustrated in FIG. 6. Consequently, excitation energy is stored in the first coil 6.

Also, the flow of current in the secondary converter 102 is the same as the flow of current in the secondary converter 102 illustrated in FIG. 6. Consequently, excitation energy is stored in the second coil 7. Also, because Vc/N3>Vimax/N1, power is not transmitted to the tertiary converter 103, and current does not flow.

FIG. 18 is a diagram illustrating the flow of current in the period r illustrated in FIG. 16. In the period r, the second switching element 8b and the third switching elements 11b and 11c are on. For this reason, as illustrated in FIG. 18, because the bidirectional switches 14a and 14b are off, current does not flow in the primary converter 101.

Also, the flow of current in the secondary converter 102 is the same as the flow of current in the secondary converter 102 illustrated in FIG. 6. Consequently, excitation energy is stored in the second coil 7. In the tertiary converter 103, current flows in the order of the tertiary capacitor 13, the third switching element 11b, the transformer 1, the third coil 10, and the third switching element 11c. Consequently, excitation energy is stored in the third coil 10.

FIGS. 19 and 20 are diagrams illustrating the flow of current in the periods s, t, and u illustrated in FIG. 16. In the periods s, t, and u, all elements are off. For this reason, after the excitation energy stored in the second coil 7 and the third coil 10 is discharged, electrical oscillations are repeated, alternating between the flow of current illustrated in FIG. 19 and the flow of current illustrated in FIG. 20.

In FIG. 19, current does not flow in the primary converter 101. The flow of current in the secondary converter 102 is the same as the flow of current in the secondary converter 102 illustrated in FIG. 8. The flow of current in the tertiary converter 103 is the same as the flow of current in the tertiary converter 103 illustrated in FIG. 8.

In FIG. 20, current does not flow in the primary converter 101. The flow of current in the secondary converter 102 is the same as the flow of current in the secondary converter 102 illustrated in FIG. 10. The flow of current in the tertiary converter 103 is the same as the flow of current in the tertiary converter 103 illustrated in FIG. 10.

Considering the symmetry of the circuits in the converter 100, the switching timings in the period v of the control pattern C1 are symmetrical with the switching timings in the period p of the control pattern C1, and therefore a description is omitted.

Flow of Processes in Control Pattern D1

Figure 21:
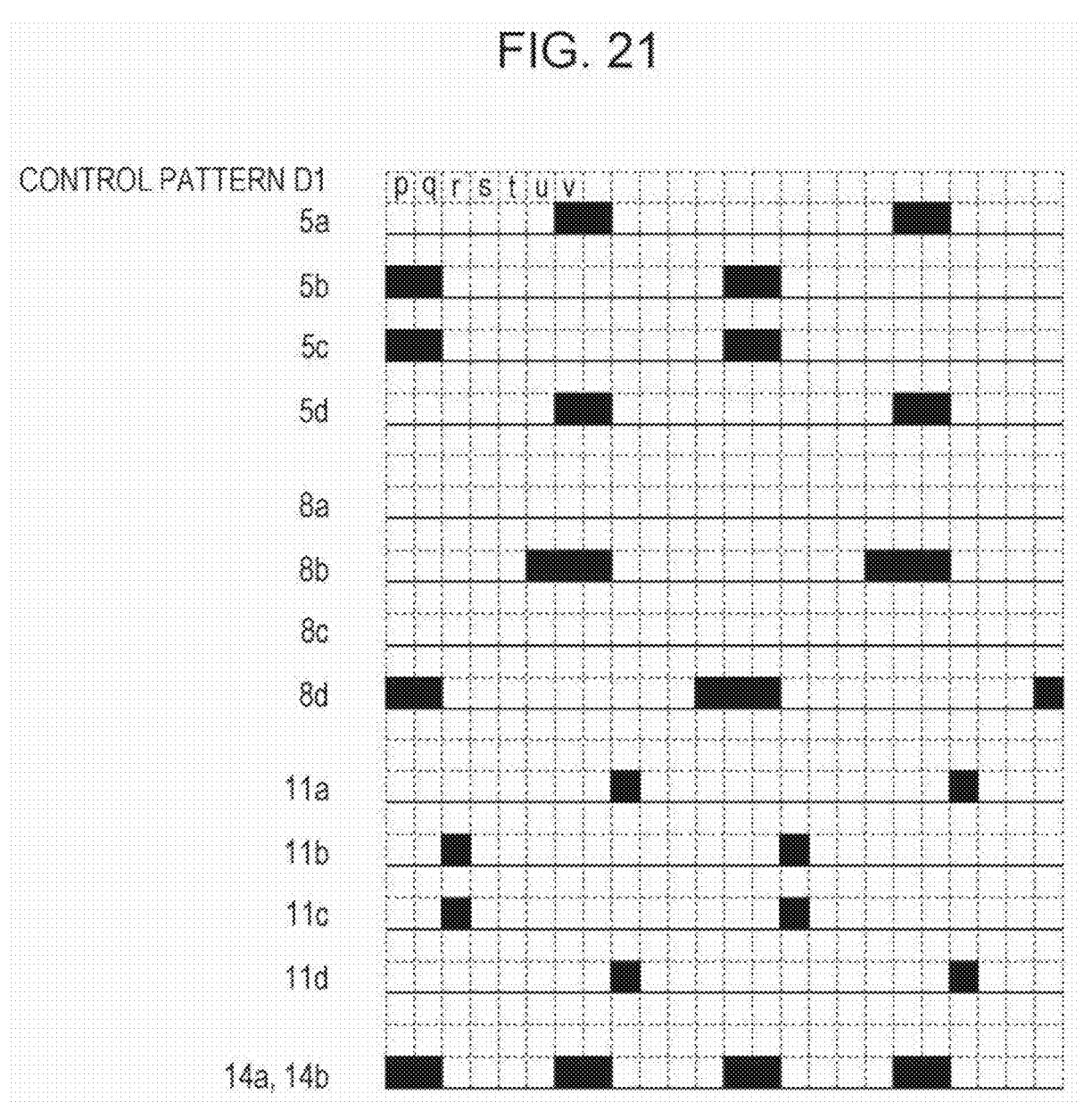

FIG. 21 is a diagram illustrating time transitions of switching control in the control pattern D1. FIG. 22 is a diagram illustrating the flow of current in the periods p and q illustrated in FIG. 21. In the periods p and q, the first switching elements 5b and 5c, the second switching element 8d, and the bidirectional switches 14a and 14b are on. For this reason, as illustrated in FIG. 22, the flow of current in the primary converter 101 is the same as the flow of current in the primary converter 101 illustrated in FIG. 6. Consequently, excitation energy is stored in the first coil 6.

Also, the flow of current in the secondary converter 102 is the same as the flow of current in the secondary converter 102 illustrated in FIG. 12. Consequently, excitation energy is stored in the second coil 7. Also, because Vc/N3>Vimax/N1, power is not transmitted to the tertiary converter 103, and current does not flow.

FIG. 23 is a diagram illustrating the flow of current in the period r illustrated in FIG. 21. In the period r, the third switching elements 11b and 11c are on. For this reason, as illustrated in FIG. 23, because the bidirectional switches 14a and 14b are off, current does not flow in the primary converter 101. Note that in the period r, the second switching element 8b may also be turned on.

Also, the flow of current in the secondary converter 102 is the same as the flow of current in the secondary converter 102 illustrated in FIG. 8. Consequently, excitation energy is stored in the second coil 7. The flow of current in the tertiary converter 103 is the same as the flow of current in the tertiary converter 103 illustrated in FIG. 18. Consequently, excitation energy is stored in the third coil 10.

Figure 24:
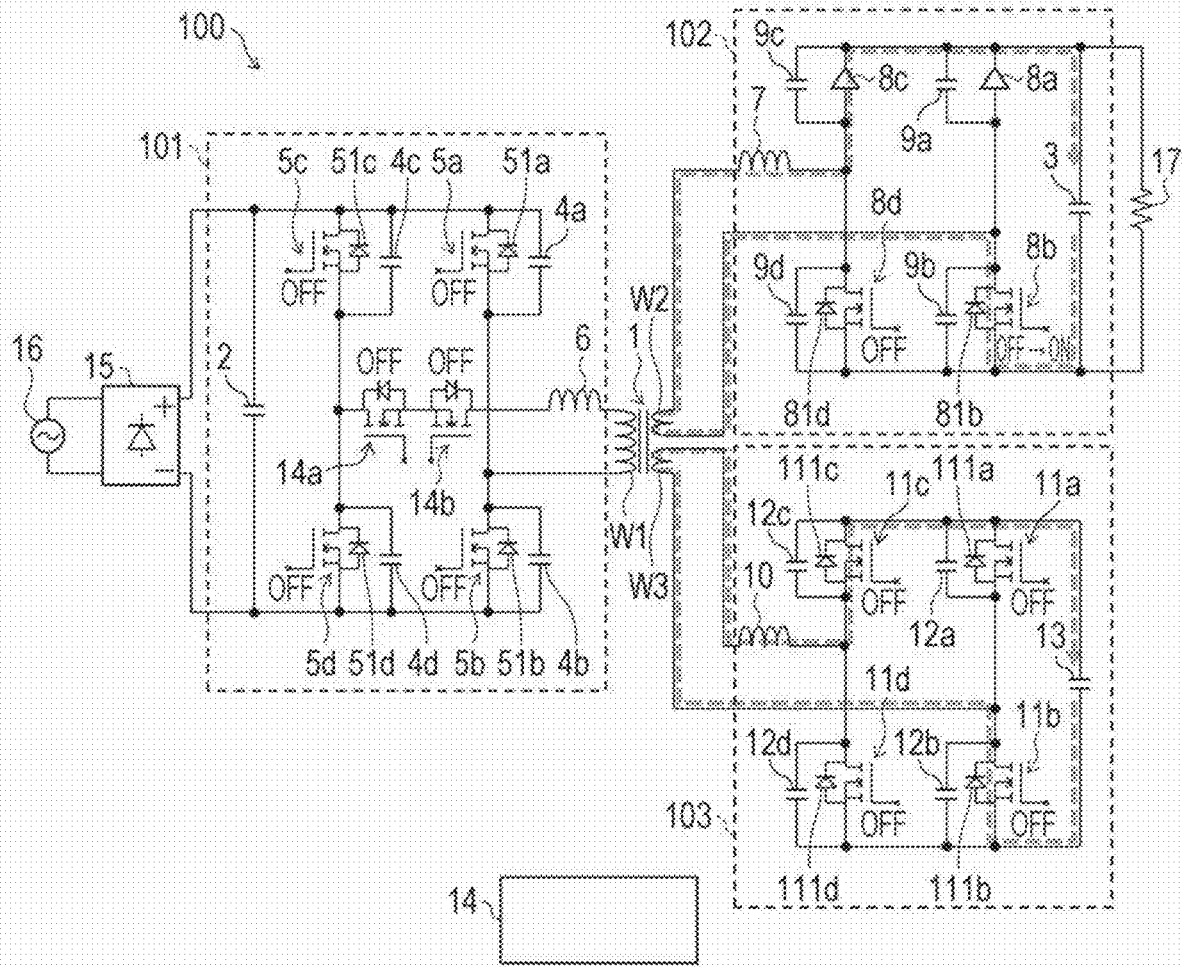
FIG. 24 is a diagram illustrating a flow of current in the periods s and t illustrated in FIG. 21.

FIGS. 24 and 25 are diagrams illustrating the flow of current in the periods s and t illustrated in FIG. 21. In the periods s and t, all elements are off. For this reason, current flows as illustrated in FIG. 24 until the excitation energy stored in the second coil 7 and the third coil 10 is discharged. After the excitation energy stored in the second coil 7 and the third coil 10 is discharged, electrical oscillations are repeated, alternating between the flow of current illustrated in FIG. 24 and the flow of current illustrated in FIG. 25.

In FIG. 24, current does not flow in the primary converter 101. The flow of current in the secondary converter 102 is the same as the flow of current in the secondary converter 102 illustrated in FIG. 8. The flow of current in the tertiary converter 103 is the same as the flow of current in the tertiary converter 103 illustrated in FIG. 8.

In FIG. 25, current does not flow in the primary converter 101. The flow of current in the secondary converter 102 is the same as the flow of current in the secondary converter 102 illustrated in FIG. 10. The flow of current in the tertiary converter 103 is the same as the flow of current in the tertiary converter 103 illustrated in FIG. 10.

In the period u, only the second switching element 8b is on, but the turning on of the second switching element 8b does not affect the path of the current. Therefore, in the period u, a state similar to the periods s and t is maintained. Considering the symmetry of the circuits in the converter 100, the switching timings in the period v of the control pattern D1 are symmetrical with the switching timings in the period p of the control pattern D1, and therefore a description is omitted.

Flow of Processes in Control Pattern E1

Figure 26:
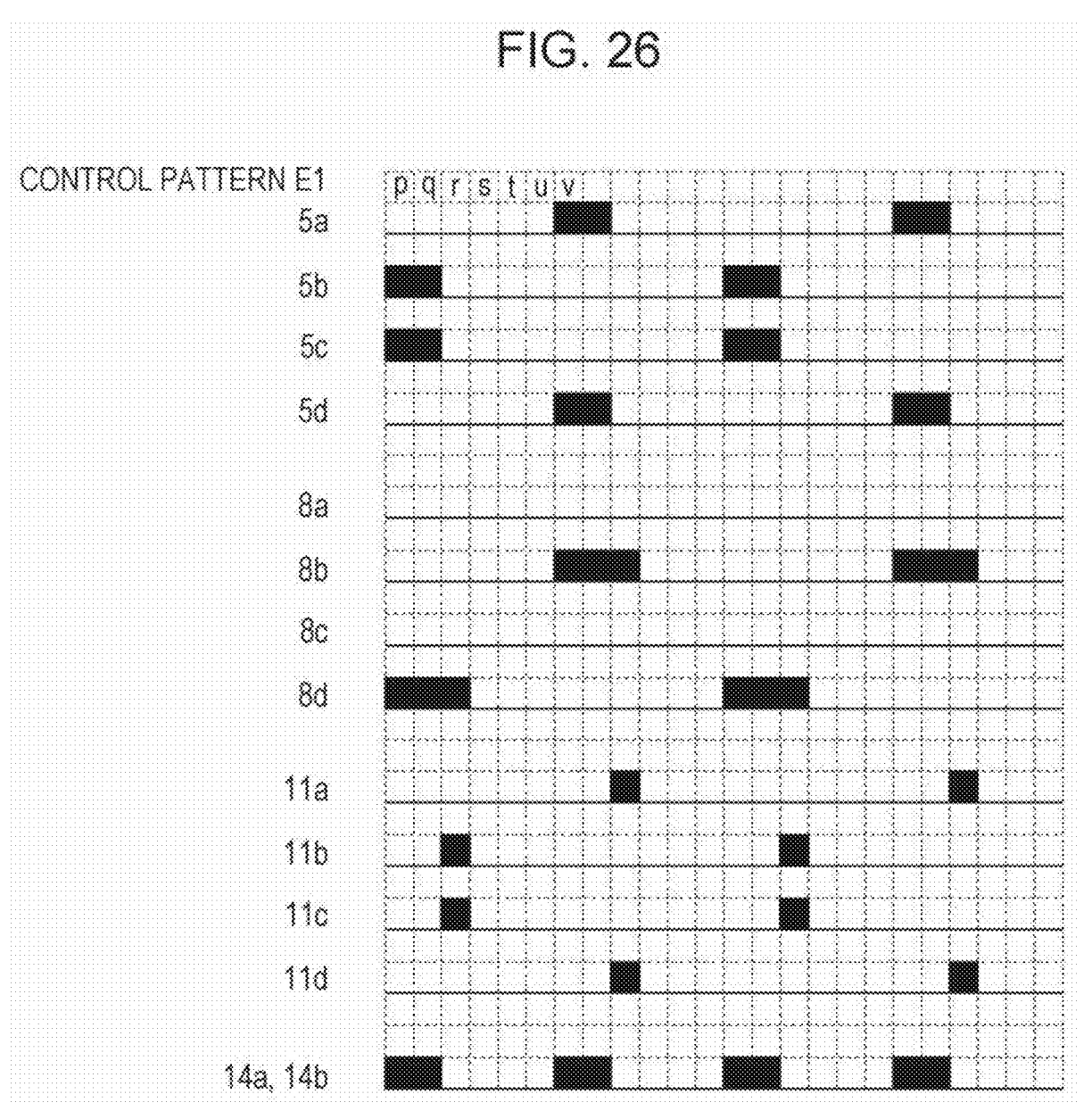

FIG. 26 illustrates time transitions of switching control in the control pattern E1. FIG. 27 illustrates the flow of current in the periods p and q illustrated in FIG. 26. In the periods p and q, the first switching elements 5b and 5c, the second switching element 8d, and the bidirectional switches 14a and 14b are on. For this reason, as illustrated in FIG. 27, the flow of current in the primary converter 101 is the same as the flow of current in the primary converter 101 illustrated in FIG. 6. Consequently, excitation energy is stored in the first coil 6.

Also, the flow of current in the secondary converter 102 is the same as the flow of current in the secondary converter 102 illustrated in FIG. 12. Consequently, excitation energy is stored in the second coil 7. Also, because Vc/N3>Vimax/N1, power is not transmitted to the tertiary converter 103, and current does not flow.

FIG. 28 is a diagram illustrating the flow of current in the period r illustrated in FIG. 26. In the period r, the second switching element 8d and the third switching elements 11b and 11c are on. For this reason, as illustrated in FIG. 28, because the bidirectional switches 14a and 14b are off, current does not flow in the primary converter 101.

Also, the flow of current in the secondary converter 102 is the same as the flow of current in the secondary converter 102 illustrated in FIG. 12. Consequently, excitation energy is stored in the second coil 7. The flow of current in the tertiary converter 103 is the same as the flow of current in the tertiary converter 103 illustrated in FIG. 8. Consequently, excitation energy is stored in the third coil 10.

FIGS. 29 and 30 are diagrams illustrating the flow of current in the periods s, t, and u illustrated in FIG. 26. In the periods s, t, and u, all elements are oft. For this reason, excitation energy is stored in the second coil 7 and the third coil 10. Also, current flows as illustrated in FIG. 29 until the excitation energy stored in the second coil 7 and the third coil 10 is discharged. After the excitation energy stored in the second coil 7 and the third coil 10 is discharged, electrical oscillations are repeated, alternating between the flow of current illustrated in FIG. 29 and the flow of current illustrated in FIG. 30.

In FIG. 29, current does not flow in the primary converter 101. The flow of current in the secondary converter 102 is the same as the flow of current in the secondary converter 102 illustrated in FIG. 8. The flow of current in the tertiary converter 103 is the same as the flow of current in the tertiary converter 103 illustrated in FIG. 8.

In FIG. 30, current does not flow in the primary converter 101. The flow of current in the secondary converter 102 is the same as the flow of current in the secondary converter 102 illustrated in FIG. 10. The flow of current in the tertiary converter 103 is the same as the flow of current in the tertiary converter 103 illustrated in FIG. 10.

Considering the symmetry of the circuits in the converter 100, the switching timings in the period v of the control pattern E1 are symmetrical with the switching timings in the period p of the control pattern E1, and therefore a description is omitted.

Software Implementation Example

The control block (particularly the control unit 14) of the converter 100 may be implemented by a logical circuit (hardware) formed on an integrated circuit (IC chip) or the like, but may also be implemented by software.

In the latter case, the converter 100 is provided with a computer that executes the instructions of a program, that is, software that achieves each function. The computer is provided with at least one processor (control device) for example, and is also provided with at least one computer-readable recording medium storing the program. Additionally, by having the processor read out the program from the recording medium and execute the program on the computer, the object of the present invention is achieved.

For the processor, a central processing unit (CPU) can be used, for example. For the recording medium, a "non-transitory medium" can be used, which includes not only memory such as read-only memory (ROM), but also media such as a tape, a disk, a card, semiconductor memory, or a programmable logic circuit. Also, random access memory (RAM) or the like into which to load the program additionally may be provided. Furthermore, the program may also be supplied to the computer through any type of transmission medium (such as a communication network or a broadcast wave) capable of transmitting the program. Note that one aspect of the present invention may also be realized in the form of a data signal embedded in a carrier wave, in which the program is embodied by electronic transmission.

CONCLUSION

A converter according to Aspect 1 of the prevent invention has a configuration provided with: a transformer having a primary winding, a secondary winding, and a tertiary winding; a primary converter, connected to the primary winding, that includes a plurality of first switching elements; a secondary converter, connected to a load and the secondary winding, that includes a plurality of second switching elements; a tertiary converter, connected to the tertiary winding, that includes a plurality of third switching elements and a capacitor; and a control unit that performs a switching control with respect to the plurality of first switching elements, the plurality of second switching elements, and the plurality of third switching elements such that power is supplied from the primary converter to the secondary converter while keeping a voltage supplied to the load constant, and also such that power is supplied from the primary converter to the tertiary converter while keeping a current supplied to the capacitor constant.

A converter according to Aspect 2 of the present invention may be configured such that, in Aspect 1, the control unit performs the switching control such that power is supplied from the tertiary converter to the secondary converter while keeping a voltage supplied to the load constant.

A converter according to Aspect 3 of the present invention may be configured such that, in Aspect 1 or 2, the control unit performs the switching control such that a power factor between a current input into the primary converter and a voltage input into the primary converter is within a prescribed value.

A converter according to Aspect 4 of the present invention may be configured such that, in Aspect 3, the control unit performs the switching control such that power is supplied from the primary converter to the tertiary converter in a case where a voltage input into the primary converter is a predetermined threshold value or higher, and such that power is supplied from the tertiary converter to the secondary converter in a case where the voltage input into the primary converter is lower than the predetermined threshold value.

A converter according to Aspect 5 of the present invention may be configured such that, in Aspect 3, the control unit performs the switching control such that power is supplied from the tertiary converter to the secondary converter in a state in which power is not input into the primary converter.

A converter according to Aspect 6 of the present invention may be configured such that, in Aspect 1 or 2, the control unit performs the switching control such that a switching timing in a case where a current output from the secondary converter to the load is equal to or greater than a predetermined specific value is different from a switching timing in a case where the current output from the secondary converter to the load is less than the predetermined specific value.

A converter according to Aspect 7 of the present invention may be configured such that, in Aspect 6, the control unit performs the switching control such that a switching process in a case where the current output from the secondary converter to the load is equal to or greater than a predetermined specific value is different from a switching process in a case where the current output from the secondary converter to the load is less than the predetermined specific value.

A converter according to Aspect 8 of the present invention may be configured such that, in Aspect 1 or 2, in a case where the switching control is performed by the control unit such that power is supplied from the primary converter or the tertiary converter to the secondary converter while keeping a voltage supplied to the load constant, a voltage input into the secondary converter is not more than a maximum value of a voltage tolerance of the load.

A converter according to Aspect 9 of the present invention may be configured such that, in Aspect 1 or 2, in a case where the switching control is performed by the control unit such that power is supplied from the primary converter to the tertiary converter while keeping a current supplied to the capacitor constant, a voltage input into the tertiary converter is less than a minimum value of a voltage range in which current flows to the capacitor.

The present invention is not limited to the embodiments described above. Various modifications are possible within the scope expressed in the claims, and any embodiment obtained by appropriately combining the technical means respectively disclosed in different embodiments is also included in the technical scope of the present invention. Furthermore, new technical features can be formed by combining the technical means respectively disclosed in the embodiments.

REFERENCE SIGNS LIST 1 transformer
5a to 5d first switching element
8b, 8d second switching element
11a to 11d third switching element
13 tertiary capacitor
14 control unit
17 load
100 converter
101 primary converter
102 secondary converter
103 tertiary converter
W1 primary winding
W2 secondary winding
W3 tertiary winding

What is claimed is:
1. A converter comprising:
a transformer having a primary winding, a secondary winding, and a tertiary winding;
a primary converter, connected to the primary winding, that includes a plurality of first switching elements;
a secondary convener, connected to a load and the secondary winding, that includes a plurality of second switching elements;
a tertiary converter, connected to the tertiary winding, that includes a plurality of third switching elements and a capacitor; and a control unit that performs a switching control with respect to the plurality of first switching elements, the plurality of second switching elements, and the plurality of third switching elements such that power is supplied from the primary convener to the secondary converter while keeping a voltage supplied to the load constant, and also such that power is supplied from the primary convener to the tertiary converter while keeping a current supplied to the capacitor constant, wherein the control unit performs the switching control in order to maintain a power factor between a current input into the primary converter and a voltage input into the primary converter within a prescribed value.

2. The converter according to claim 1, wherein the control unit performs the switching control such that power is supplied from the tertiary converter to the secondary converter while keeping the voltage supplied to the load constant.

3. The converter according to claim 1, wherein the control unit performs the switching control such that power is supplied from the primary converter to the tertiary converter in a case where the voltage input into the primary converter is a predetermined threshold value or higher, and such that power is supplied from the tertiary converter to the secondary converter in a case where the voltage input into the primary converter is lower than the predetermined threshold value.

4. The converter according to claim 1, wherein the control unit performs the switching control such that power is supplied from the tertiary converter to the secondary converter in a state in which power is not input into the primary converter.

5. The converter according to claim 1, wherein the control unit performs the switching control such that a switching timing, in a case where a current output from the secondary converter to the load is equal to or greater than a first predetermined specific value, is different from a switching timing in a case where the current output from the secondary converter to the load is less than the predetermined specific value.

6. The converter according to claim 5, wherein the control unit performs the switching control such that a switching process, in a case where the current output from the secondary converter to the load is equal to or greater than a second predetermined specific value, is different from a switching process in a case where the current output from the secondary converter to the load is less than the predetermined specific value.

7. The converter according to claim 1, wherein in a case where the switching control is performed by the control unit such that power is supplied from the primary converter or the tertiary converter to the secondary converter while keeping the voltage supplied to the load constant, a voltage input into the secondary converter is not more than a maximum value of a voltage tolerance of the load.

8. The converter according to claim 1, wherein in a case where the switching control is performed by the control unit such that power is supplied from the primary converter to the tertiary converter while keeping the current supplied to the capacitor constant, a voltage input into the tertiary converter is less than a minimum value of a voltage range in which current flows to the capacitor.

\* \* \* \* \*